(12) United States Patent
Lin et al.

(10) Patent No.: US 10,684,416 B2
(45) Date of Patent: Jun. 16, 2020

(54) FABRICATION-TOLERANT AND BROADBAND POLARIZATION SPLITTER AND ROTATOR

(71) Applicant: Finisar Corporation, Sunnyvale, CA (US)

(72) Inventors: Shiyun Lin, San Diego, CA (US); Jin-Hyoung Lee, San Diego, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/045,218

(22) Filed: Jul. 25, 2018

(65) Prior Publication Data

US 2019/0033520 A1 Jan. 31, 2019

Related U.S. Application Data

(60) Provisional application No. 62/537,786, filed on Jul. 27, 2017.

(51) Int. Cl.
| | |
|---|---|
| *G02B 6/00* | (2006.01) |
| *G02B 6/126* | (2006.01) |
| *G02B 6/122* | (2006.01) |
| *G02B 6/27* | (2006.01) |

(52) U.S. Cl.
CPC .......... *G02B 6/126* (2013.01); *G02B 6/1228* (2013.01); *G02B 6/2766* (2013.01); *G02B 6/2773* (2013.01)

(58) Field of Classification Search
CPC ...... G02B 6/126; G02B 6/2746; G02B 6/105; G02B 6/2773; G02B 6/00; G02F 1/093
See application file for complete search history.

(56) References Cited

U.S. PATENT DOCUMENTS

| | | | |
|---|---|---|---|
| 7,095,920 B1* | 8/2006 | Little | G02B 6/12002 385/131 |
| 9,405,066 B2 | 8/2016 | Mahgerefteh et al. | |
| 9,874,696 B2* | 1/2018 | Liu | G01J 3/0218 |
| 2009/0110344 A1 | 4/2009 | Little et al. | |
| 2014/0153862 A1 | 6/2014 | Picard et al. | |
| 2014/0270622 A1 | 9/2014 | Barwicz et al. | |

FOREIGN PATENT DOCUMENTS

WO  2004042458 A1  5/2004

OTHER PUBLICATIONS

K. Tan, Y. Huang, G. Lo, C. Yu, and C. Lee, "Ultra-broadband fabrication-tolerant polarization splitter and rotator," in OFC 2017, paper Th1G.7.
International Search Report and Written Opinion dated Oct. 16, 2018, in related PCT Application No. PCT/US2018/044227.

* cited by examiner

*Primary Examiner* — Jennifer Doan
(74) *Attorney, Agent, or Firm* — Maschoff Brennan

(57) ABSTRACT

A polarization splitter rotator (PCR) can include a substrate, a primary through waveguide formed in the substrate having a custom tapered top region over a bottom region, a secondary cross waveguide formed in the substrate having a custom body shape, and a gap between the primary through waveguide and secondary cross waveguide. The custom tapered top region forces the TM mode to convert to a TE mode and cross into the secondary cross waveguide.

24 Claims, 21 Drawing Sheets

FABRICATION-TOLERANT AND BROADBAND POLARIZATION SPLITTER AND ROTATOR

CROSS-REFERENCE

This application claims priority to U.S. Provisional Application No. 62/537,786 filed Jul. 27, 2017, which provisional application is incorporated herein by specific reference in its entirety.

BACKGROUND

Unless otherwise indicated herein, the materials described herein are not prior art to the claims in the present application and are not admitted to be prior art by inclusion in this section.

Polarization splitter rotators (PSR) can be useful components for a photonic integrated circuit (PIC) on both Si and Si/SiN hybrid platforms. Integrated optical devices and circuits are often polarization sensitive, and usually designed for TE mode only. As such, the TM mode of the input light may be converted to the TE mode. Polarization insensitive circuits can use a high performance PSR to split and rotate a combination of TE/TM input light to TE light only.

Often, the light that is input can include both the TM mode and TE mode, but when coupled to a PIC, the TE mode is preferred. The TE and TM are split and the TM is converted to TE and both are provided to identical devices that operate with the same polarization.

Previously, PSR devices may have included Si/SiN hybrid platforms, with a Si substrate having a $SiO_2$ region thereover, with the $SiO_2$ region having a SiN waveguide separate from a Si waveguide (optically coupled by the $SiO_2$). In one option, the TM mode can be split from the TE mode and then subsequently rotated to transform the split TM mode to a TE mode. Another option converts the TM mode to a higher mode TE (TE01) in a polarization rotation device (PR) with the conversion in a rib waveguide structure, splits the TE01 from the TE in a polarization splitter (PS), and then converts the TE01 to TE00 in a second waveguide. However, these approaches have limited fabrication tolerance, a small bandwidth, and a low extinction ratio due to the complex mode conversion and design, which may be unfavorable.

The subject matter claimed herein is not limited to implementations that solve any disadvantages or that operate only in environments such as those described above. Rather, this background is only provided to illustrate one example of a technology area where some implementations described herein may be practiced.

SUMMARY

In some embodiments, a polarization splitter rotator (PCR) can include: a substrate; a primary through waveguide formed in the substrate having a through first end with a through first width and through first thickness with a through body with a widening taper extending from the through first end to a through second end that has a through second width that is larger than the through first width and the through second end having at least a portion thereof with a through second thickness that is smaller than the through first thickness, the through body having a top portion that extends toward the through second end and a bottom portion that extends to the through second end, the bottom portion having the widening taper from the through first end to the through second end, the top portion having a narrowing taper from the through first end toward the through second end that exposes a surface of the bottom portion, the exposed surface of the bottom portion having a widening taper from the through first end toward the through second end; a secondary cross waveguide formed in the substrate having a cross first end with a cross first width and cross thickness with a cross body with a widening taper extending from the cross first end to a cross second end that has a cross second width that is larger than the cross first width and the cross second end having the cross thickness; and a gap between the primary through waveguide and secondary cross waveguide.

The PSR can have various configurations. In some aspects, the SPR has a gap that has a substantially constant width from a gap first end between the through first end and cross first end to a gap second end between the through second end and cross second end. In some aspects, the substrate is $SiO_2$. In some aspects, the primary through waveguide is Si. In some aspects, the secondary cross waveguide is Si. In some aspects, the primary through waveguide is SiN. In some aspects, the secondary cross waveguide is SiN. In some aspects, the primary through waveguide has an "L" shaped cross-sectional profile. In some aspects, the secondary cross waveguide has a rectangular cross-sectional profile with the cross first width is larger than the cross thickness. In some aspects, the top portion of the primary through waveguide has an etched face extending from a top surface to the exposed surface of the bottom portion. In some aspects, the etched face is linear between the through first end to the through second end. In some aspects, the etched face is concave between the through first end to the through second end. In some aspects, the etched face is convex between the through first end to through second end. In some aspects, the etched face is planar from the top surface to the exposed surface. In some aspects, the etched face terminates at a corner of the through second end. In some aspects, the etched face terminates between the through first end and through second end on the side closest to the secondary cross waveguide. In some aspects, the etched face terminates between corners of the through second end. In some aspects, the etched face initiates at a corner of the through first end furthest from the secondary cross waveguide. In some aspects, the etched face initiates between corners of the through first end. In some aspects, the etched face initiates between the through first end and through second end on a side furthest from the secondary cross waveguide.

In some embodiments, a method of converting TM mode light to TE mode light can include: inputting light having a TE mode and a TM mode into the first through end of the primary through waveguide such that the TM mode crosses from the primary through waveguide and converts to a second TE mode and enters the secondary cross waveguide, wherein the TE mode propagates through the primary through waveguide to a through second end, and the second TE mode propagates from a crossing point through the secondary cross waveguide to the cross second end. In some aspects, the input light has a wavelength from about 1.3 microns to about 1.55 microns with a broadband of about 300-500 microns around the wavelength.

In some embodiments, a method of forming the PSR of some of the embodiments includes: forming the substrate; etching the substrate to form a first recess and a second recess, the first recess and second recess each having a first end and a second end; depositing a waveguide material in the first recess and second recess; and selectively etching the waveguide material in the first recess to form the primary through waveguide and in the second recess to form the secondary cross waveguide. In some aspects, the method can include filling the first recess and second recess with a material over the exposed surface of the primary through waveguide and over the secondary cross waveguide.

In some embodiments, a photonic integrated circuit (PIC) can include: the PSR of some of at least one of the embodiments; a separator having a through waveguide optically coupled with the primary through waveguide and a cross waveguide optically coupled with the secondary cross waveguide; and a slab to strip mode converter (STSMC) having a through STSMC optically coupled with the through waveguide of the separator and having a cross STSMC optically coupled with the cross waveguide of the separator. In some aspects, the through waveguide and cross waveguide of the separator each has the through second thickness. In some aspects, the through waveguide of the separator has an S bend. In some embodiments, the through STSMC and cross STSMC can have: a first widening taper with the through second thickness; a first body region after the first widening taper with the through second thickness; a first narrowing taper comprising: a first fork with the through second thickness; a second fork with the through second thickness; and a raised widening tapered strip between the first fork and second fork, the raised widening tapered strip having the through first thickness; a second body region after the first narrowing taper having the through first thickness; and a second narrowing taper after the second body region having the through first thickness.

In some embodiments, a slab to strip mode converter (STSMC) can include: a through STSMC; a cross STSMC; and a gap between the through STSMC and cross STSMC. In some embodiments, the through STSMC and cross STSMC has: a first widening taper with the through second thickness; and a first body region after the first widening taper with the through second thickness. The through STSMC and cross STSMC can include a first narrowing taper having: a first fork with the through second thickness; a second fork with the through second thickness; and a raised widening tapered strip between the first fork and second fork, the raised widening tapered strip having the through first thickness. The through STSMC and cross STSMC can include a second body region after the first narrowing taper having the through first thickness. The through STSMC and cross STSMC can include a second narrowing taper after the second body region having the through first thickness.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
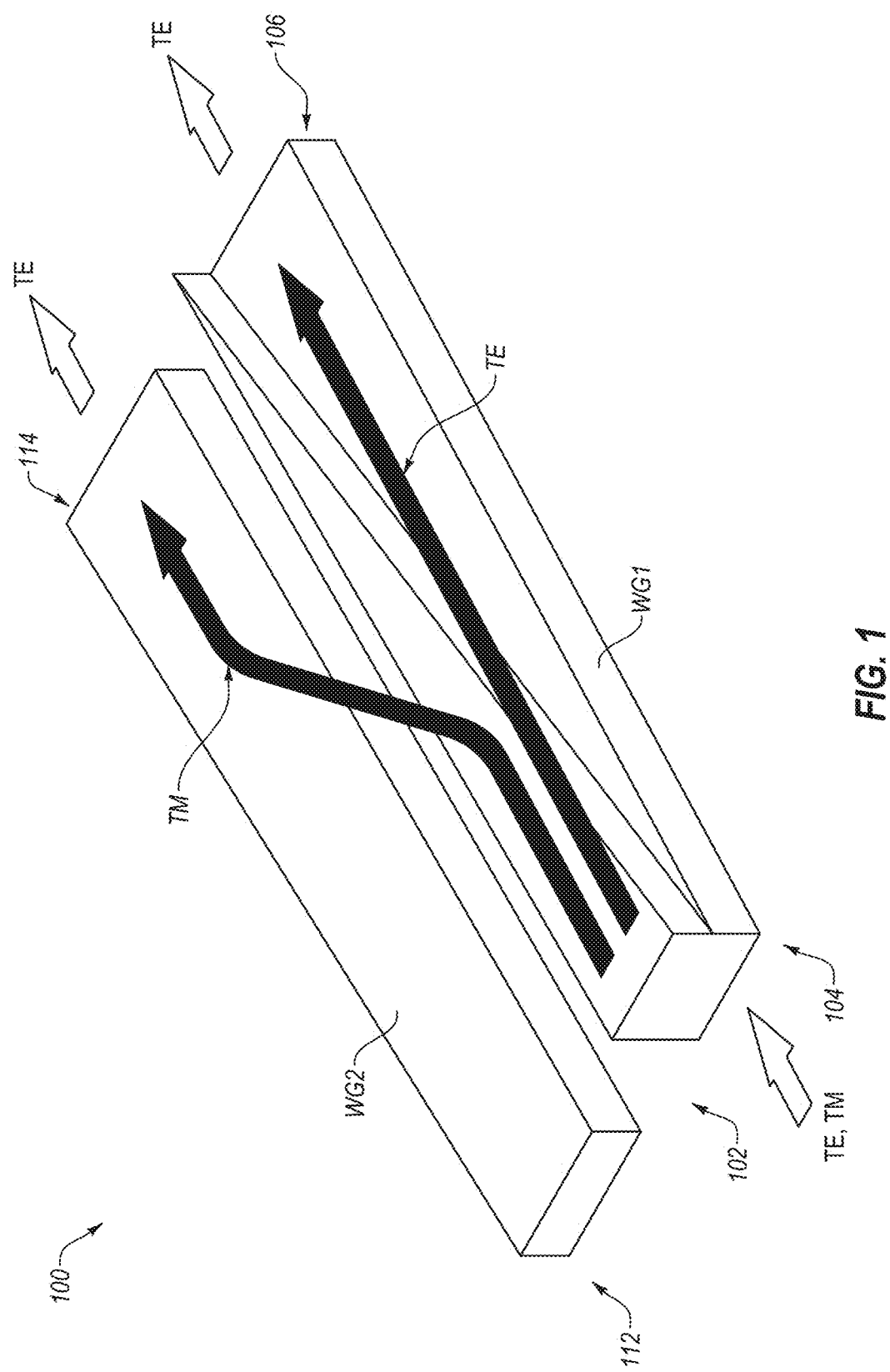
FIG. 1 illustrates an embodiment of a PSR device having a primary through waveguide WG1 and secondary cross waveguide WG2 separated by a gap.

The components and features shown in the figures are arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology relates to polarization diversity photonic integrated circuits (PIC) that include a low loss, broadband polarization splitter and rotator (PSR). The PIC, according to the disclosure herein, can be prepared with significant fabrication tolerance to allow for easier fabrication into a properly functioning PSR that can be configured to separate TE and TM mode light.

Accordingly, the technology includes a PIC having two tapered waveguides separated from each other where the primary waveguide (e.g., TE and TM modes in) is also a tapered and partially etched waveguide. The tapered and partially etched primary waveguide (e.g., through waveguide) when placed adjacent and separate from the secondary tapered waveguide (e.g., cross waveguide) can cause the TM mode to convert to the TE mode and cross into the secondary tapered waveguide to achieve a direct TM mode to TE mode conversion. The primary and secondary waveguides are designed to have a phase matching condition for the TM mode light that is input into the primary waveguide to be converted to TE mode light, crossed into the secondary waveguide, and obtained as TE mode light as output from the secondary waveguide. The TE mode light input into the primary waveguide remains confined in the primary waveguide, and can be received as TE light output from the primary waveguide.

The tapered waveguide design for both the primary waveguide and secondary waveguide allows for high efficient TM-TE mode conversion, and simultaneously prevents the TE mode input into the primary waveguide to be coupled to the cross secondary waveguide. However, it should be recognized that the partially etched primary waveguide may contribute to the TE mode input into the primary waveguide being retained therein.

The design of the primary and secondary waveguides allows for variations in the manufacturing so that small dimension variations are allowable while still obtaining the TM to TE conversion and shift from the primary waveguide to the secondary waveguide. It is thought that small waveguide dimension variations may only change where TM to TE mode conversion happens along the taper, and therefore makes the device having these primary and secondary waveguides tolerant to any fabrication errors. That is, small variations do not significantly alter the TM to TE mode conversion or the crossing of the TM to the cross secondary waveguide. Similarly, phase matching conditions can be met somewhere along the taper so that a broad range of wavelengths can be input into the primary waveguide to ensure significant broadband operation.

In addition to improved fabrication tolerance in design and manufacturing as well as the ability to use broadband light, the combination of the primary waveguide and secondary waveguide configured as described herein provides for a higher mode conversion efficiency by increasing the mode overlap between the TM mode of the input light into the primary waveguide and the TE mode obtained as output from the cross secondary waveguide. Accordingly, the combination of the primary waveguide and secondary waveguide allows for both thin and thick Si or SiN waveguide platforms.

In one embodiment, the combination of the primary waveguide and secondary waveguide can be configured to achieve improved fabrication tolerance on both thin and thick waveguide platforms. This allows for minor errors to occur without significantly altering or decreasing the performance.

In one embodiment, the combination of the primary waveguide and secondary waveguide allows for squeezing the TM mode from the primary waveguide toward the cross secondary waveguide. Also, the transfer of the TM mode to the cross secondary waveguide together with the less confined TE modes in the secondary waveguide enables high TM to TE mode conversion efficiency.

It has been found that the combination of the primary waveguide and secondary waveguide allows for fast TM to TE mode conversion. As such, the shorter distance that the TM mode light travels before converting to TE mode light reduces the device length, and thereby the primary waveguide and secondary waveguide may be shorter. Additionally, the fast mode conversion allows for the gap between the primary waveguide and secondary waveguide to be larger or smaller. Accordingly, the configuration reduces the requirement of a small gap between the primary waveguide and secondary waveguide, which thereby allows for larger gaps that further allows for variations and improved manufacturing tolerances.

The combination of the primary waveguide and secondary waveguide and cooperative configuration thereof allows for broadband. It is thought that the broadband may be due to the tapered design of one or both of the primary waveguide and secondary waveguide. Additionally, the cooperative configuration allows for low loss due to the simple design with the single stage TM to TE mode conversion.

The PSR can be a component for photonic integrated circuits (PICs) on both Si and Si/SiN hybrid platforms. Integrated optical devices and circuits are polarization sensitive, and usually designed for TE mode only. Polarization insensitive circuits require high performance PSR to split and rotate a combination of TE/TM input light to TE light only. Objectives for a suitable PSR can include: Good fabrication tolerance; Broadband; High extinction ratio; and Low loss. It is noted that the PSR described herein satisfies these objectives.

In one aspect, the partial etch (e.g., body has cross-sectional profile of width and height plane with "L" shape as shown in the figures) of the primary through waveguide allows for breaking the vertical symmetric for mode coupling between TE and TM, which needs to break both the horizontal and vertical symmetric. The configuration allows the PSR device to have a thinner waveguide. Also, this design has widening tapers on both waveguides from the inlet to the outlet because the tapers can provide the broadband function and also allow for a large fabrication tolerance. The longer wavelength will have phase matching conditions in earlier regions (near input) and then a shorter wavelength will have phase matching conditions somewhere later (further from input). The taper allows for phase matching conditions along the taper, which makes this device broadband. Similarly, if the wavelength is changed, the phase matching will just move along the taper to find the phase matching location along the taper, and there is still coupling. This allows for a good fabrication tolerance.

In one embodiment, the combined primary through waveguide and secondary cross waveguide allows for a wider range of dimensions, such as width, thickness, and length, as well as tapers and partial etch configurations. That is, the present configuration is not limited to thin waveguides (e.g., around 200 nm thickness), but can be much thicker, such as 300 nm or thicker up to 600 nm thickness. The increased dimension also allows for increased width.

FIG. 1 illustrates a PSR device 100 having a primary through waveguide WG1 and secondary cross waveguide WG2 separated by a gap 102. A light source (inlet arrow with TE, TM) is optically coupled with the primary through waveguide WG1 to provide light having TE mode and TM mode as shown. The TE mode traverses the primary through waveguide WG1 to the second end 106 (outlet) while the TM mode crosses to the secondary cross waveguide WG2 and converts to TE mode, where the TE mode is obtained at the second end 114 (outlet).

Figure 1A:
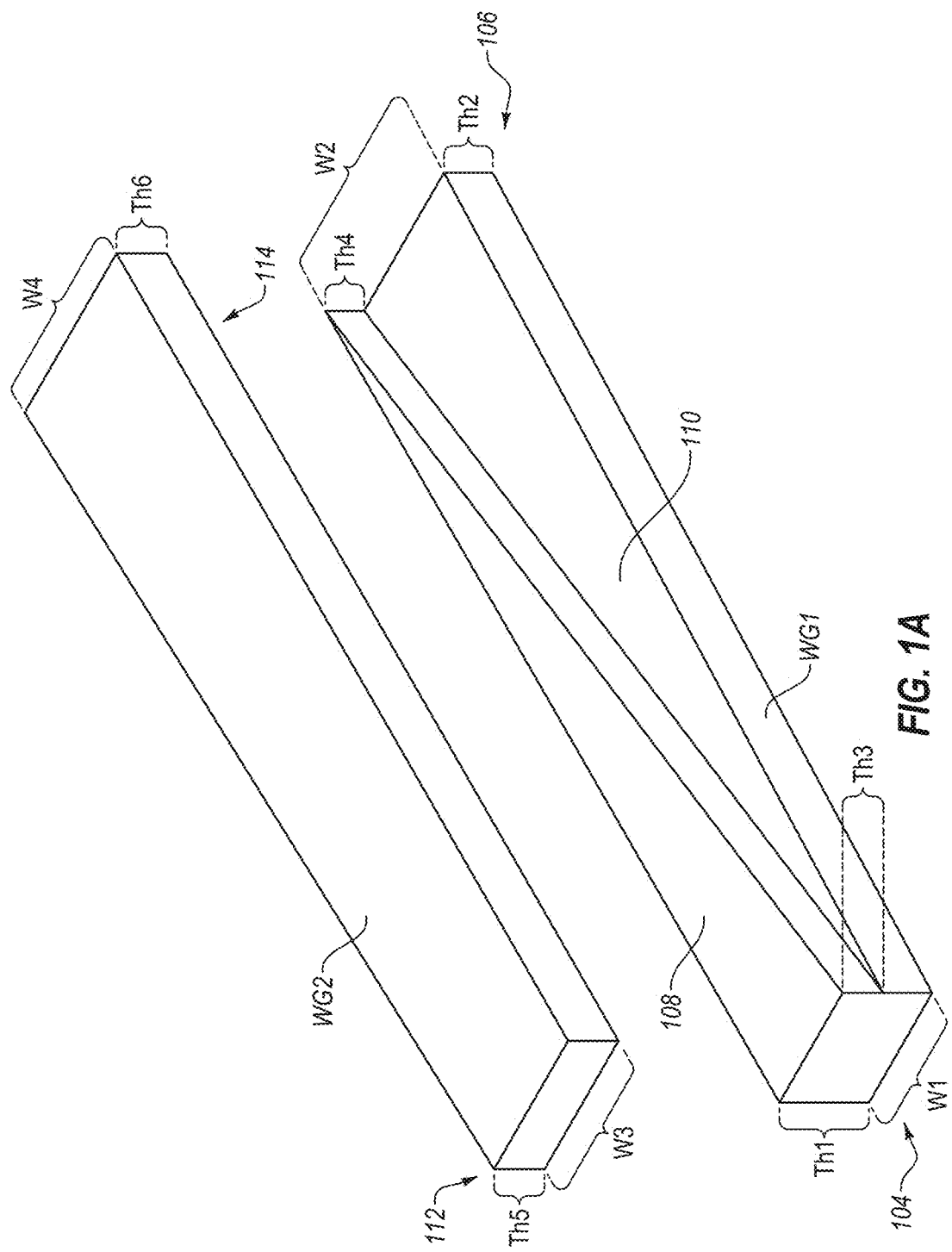
FIG. 1A illustrates an embodiment of the primary through waveguide WG1 being separate from the secondary cross waveguide WG2.

FIG. 1A shows the primary through waveguide WG1 separate from the secondary cross waveguide WG2 so that the relative dimensions can be observed. The primary through waveguide WG1 includes a first end 104 having a width W1 and thickness Th1 that is tapered to the second end 106 that has a larger width W2 and smaller thickness Th2. The top portion 108 of the primary through waveguide WG1 has a triangular profile (in width and length plane) that is different from the bottom portion 110 due to the partial etching. As such, the top portion 108 can have the same width W1 at the first end 104, but have almost no width or 0 width at the second end 106. Accordingly, the primary through waveguide WG1 has a thickness Th2 that is smaller than Th1 due to the selective etching. The top portion of the primary through waveguide WG1 can have a thickness Th3 at the first end 104 and a thickness Th4 at the second end 106. The thicknesses Th3 and Th4 can be the same, or optionally somewhat different. The bottom portion 110 can have the thickness Th2 all the way across the length. Often, the combination of Th2 and Th4 has the same thickness of Th1.

The secondary cross waveguide WG2 includes a first end 112 having a width W3 and thickness Th5 that is tapered to the second end 114 that has a larger width W4 and thickness Th6. The thicknesses Th5 and Th6 can be the same, or optionally somewhat different. Also, the thickness Th2 can be the same as thickness Th5 (and Th6).

Figure 1B:
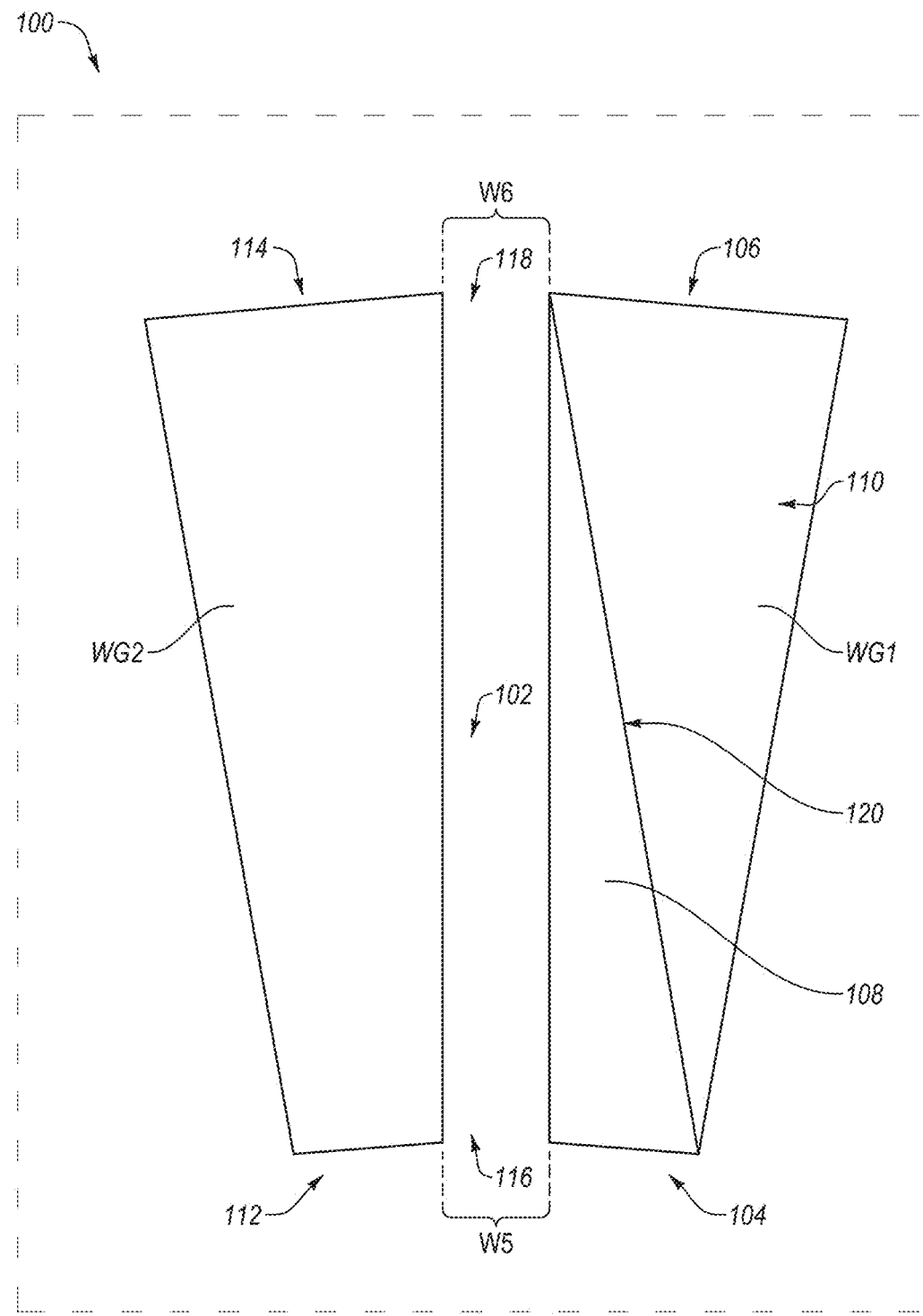
FIGS. 1B-1H illustrate different embodiments of a PSR device.

FIG. 1B shows the gap 102 having a width of W5 at a first end 116 and a width W6 at a second end 118. The width W5 can be greater than, the same as, or less than the width W6. FIG. 1B also shows the etched face 120 of the top portion 108 being linear or straight to form the triangle shaped top portion 108.

Figure 1C:
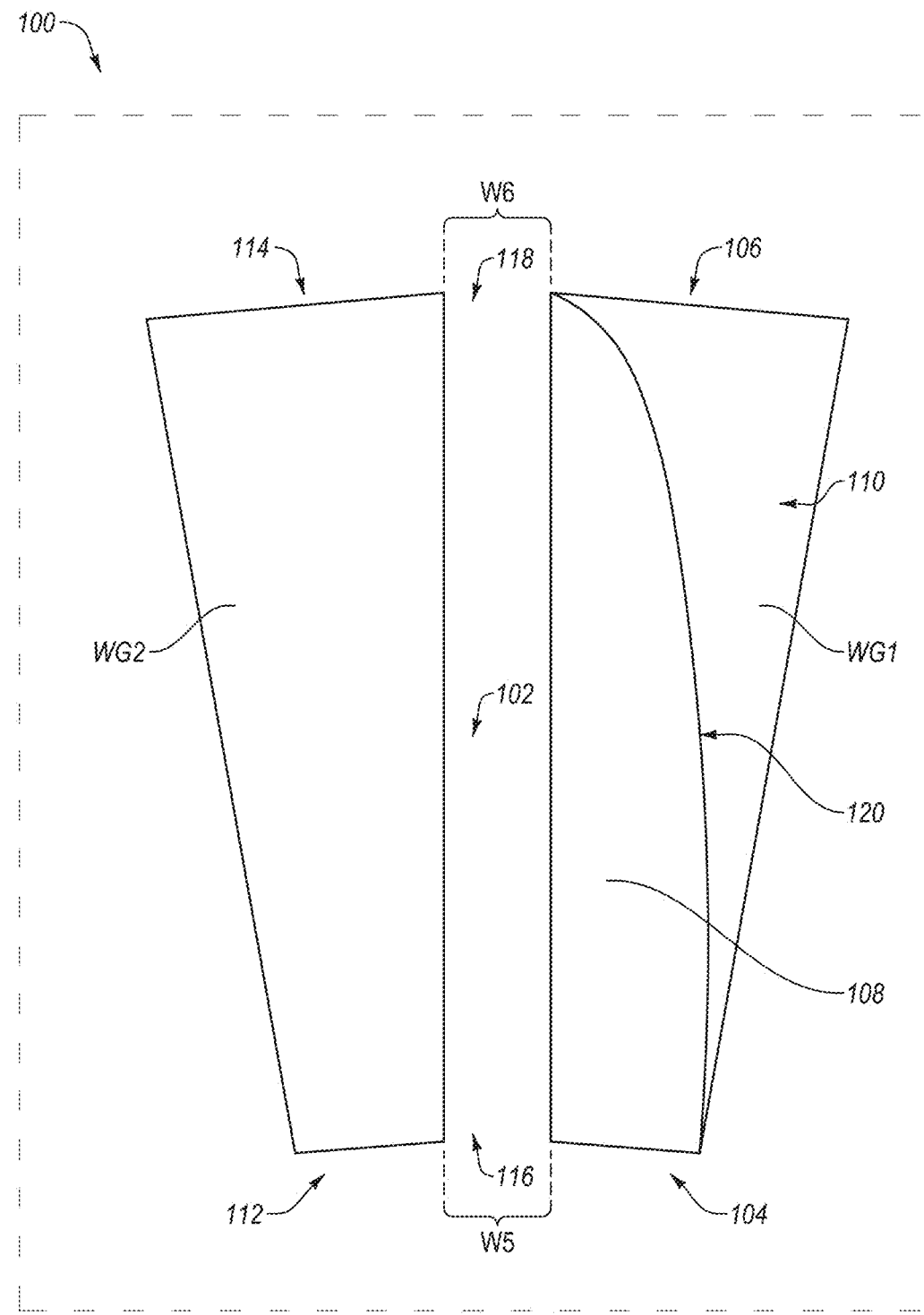
Figure 1D:
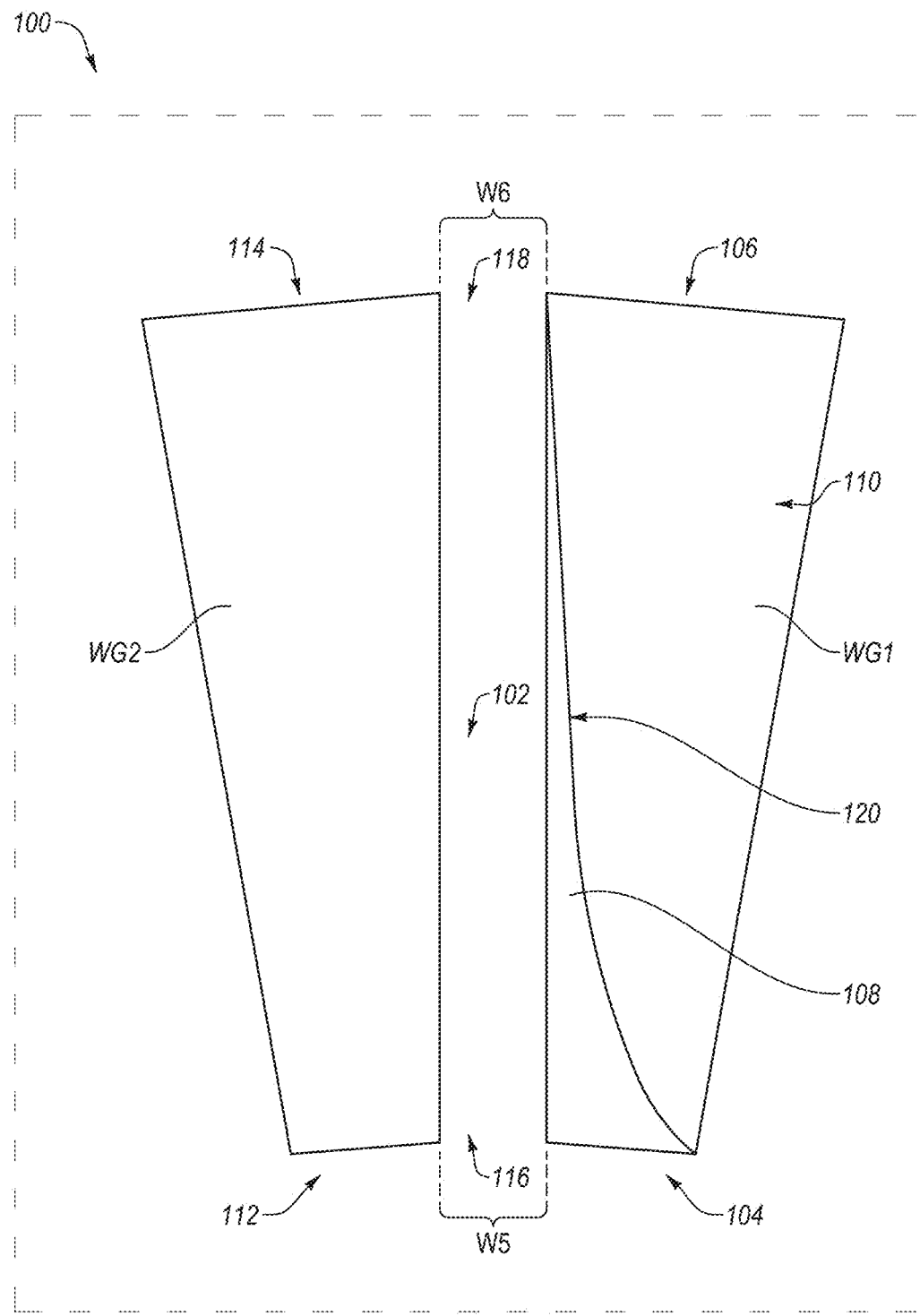
Figure 1E:
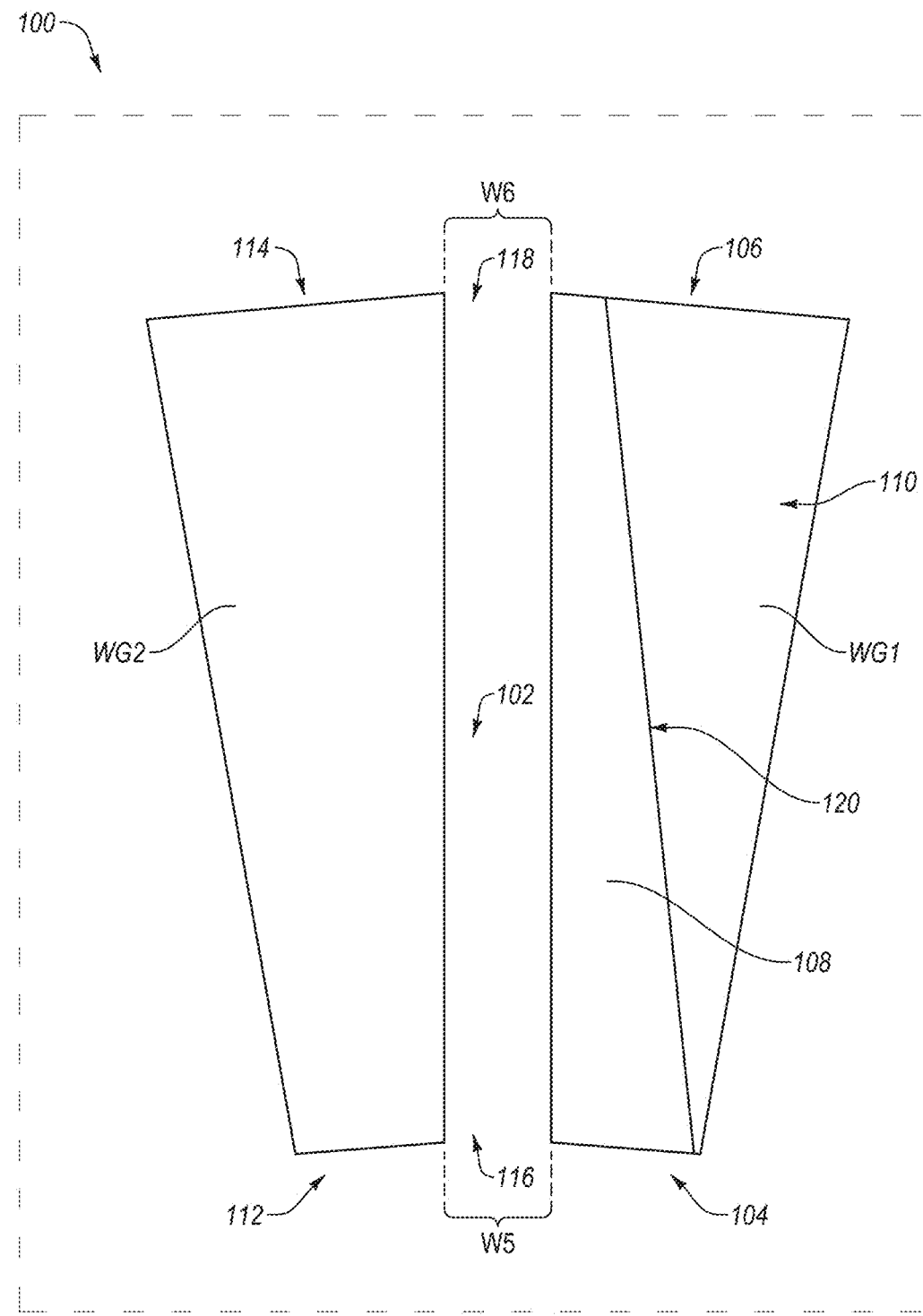
Figure 1F:
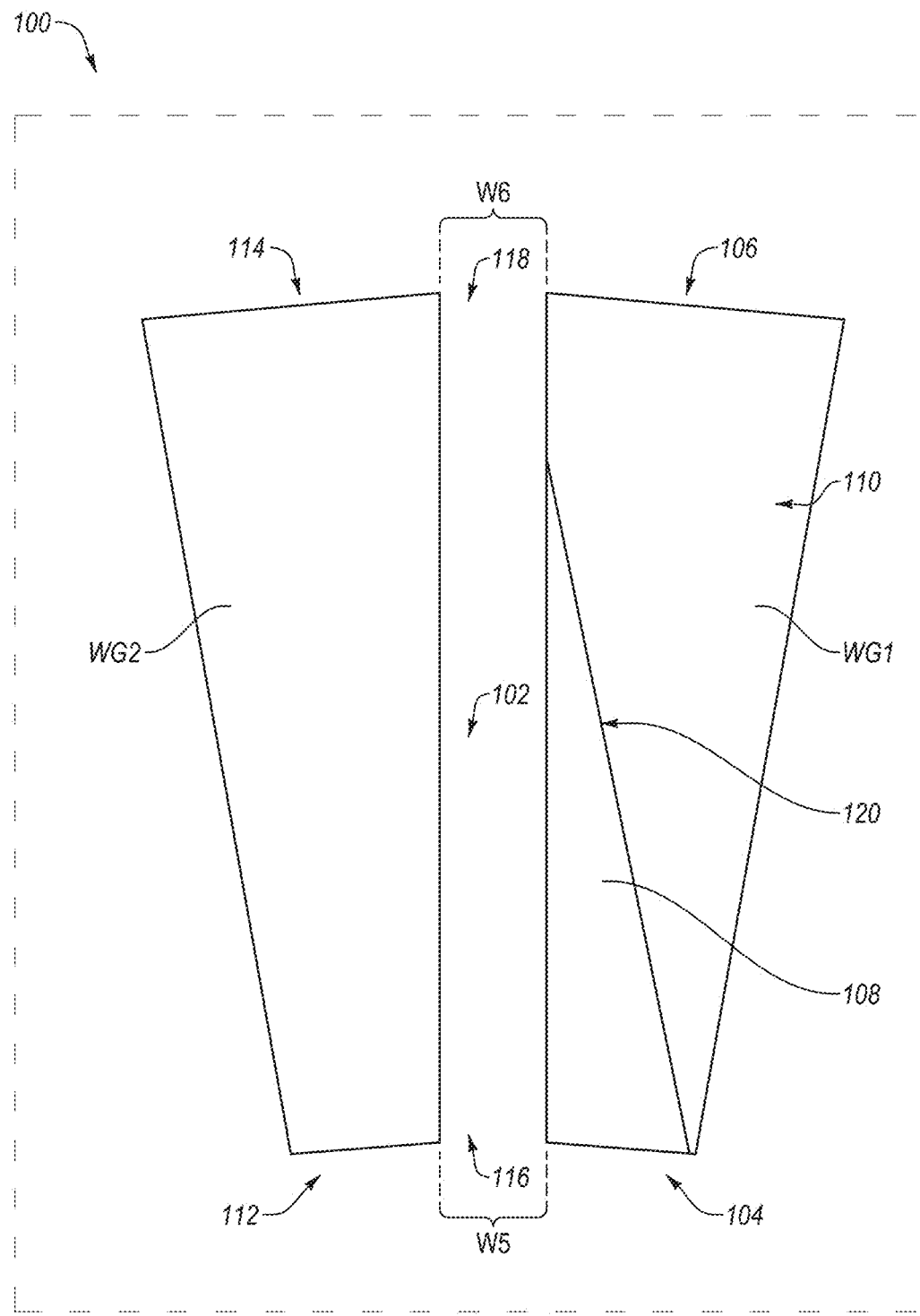
Figure 1G:
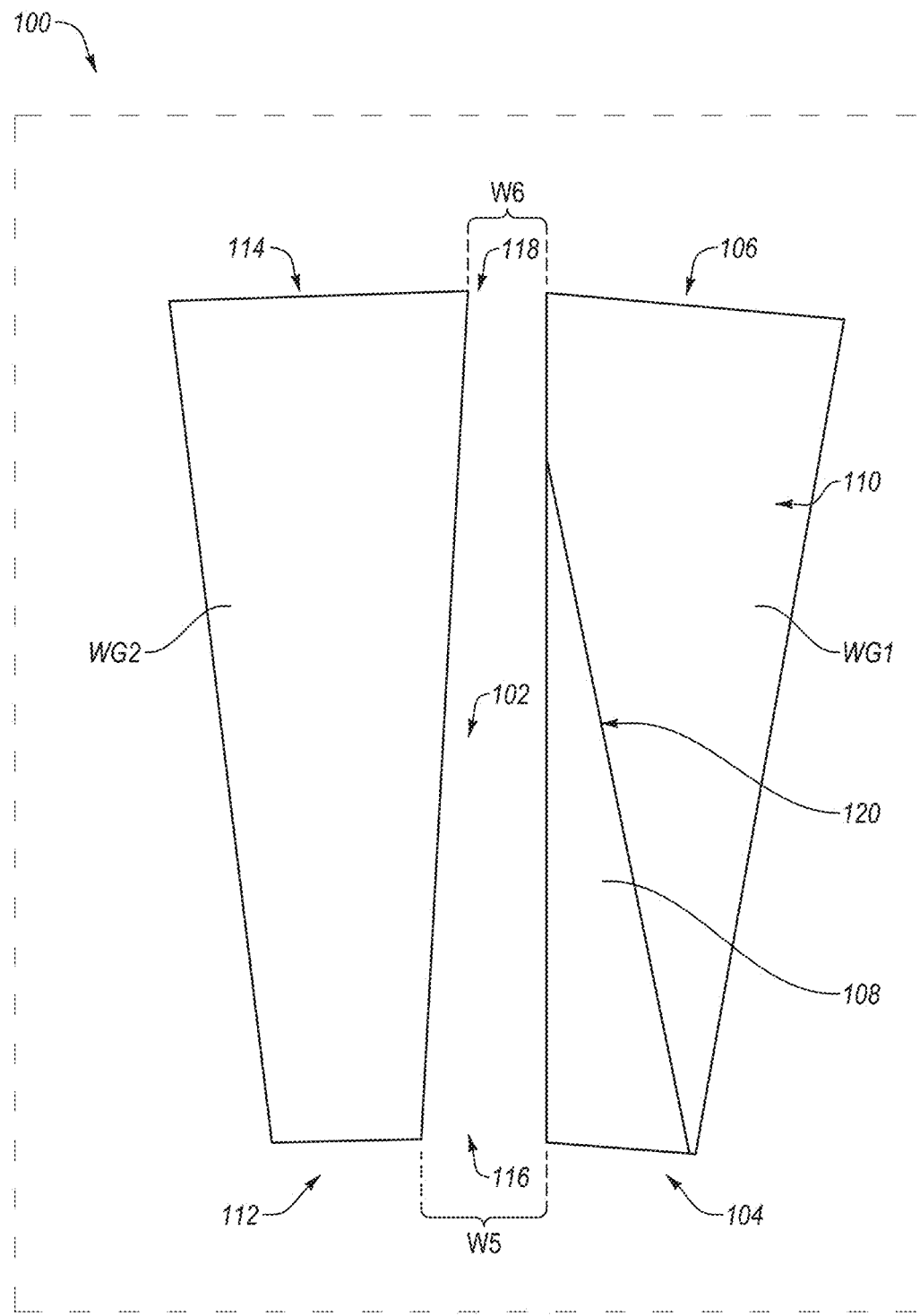
Figure 1H:
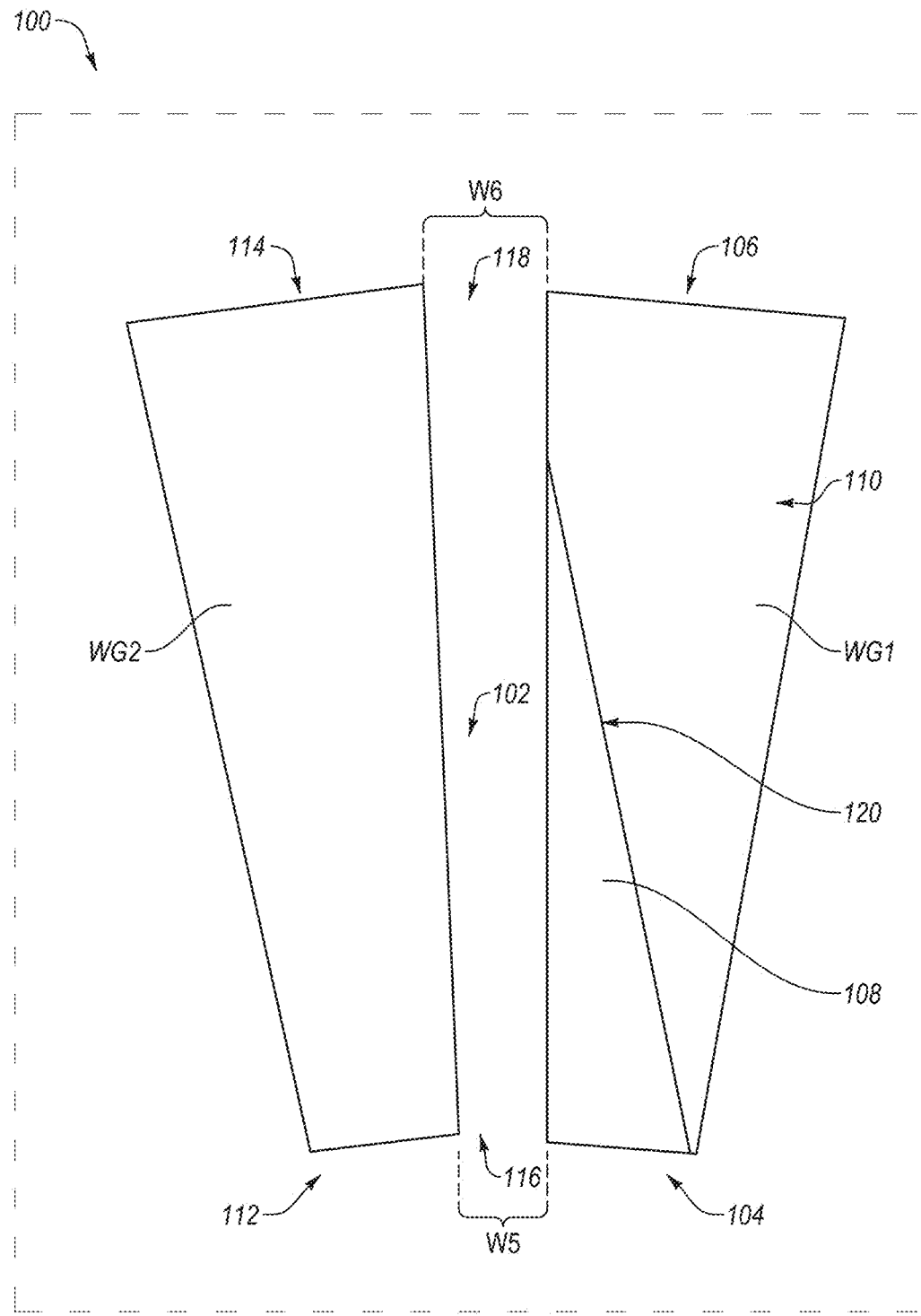

FIG. 1C shows that the etched face 120 may be curved, such as being convex relative to the gap 102. FIG. 1D shows the etched face 120 being concave relative to the gap 102. FIG. 1E shows that the etched face 120 terminates in a region at the second end 106 so that the top portion 108 is a quadrangle instead of a triangle. FIG. 1F shows that the etched face 120 terminates at the gap 102 between the first end 104 and second end 106 to form the top portion 108 as a smaller triangle, where the etched face 120 does not reach the second end 106. Thus, the etched face 120 and top portion 108 may have different shapes, such as straight or curved, that are substantially triangular as shown, or different end points whether at the corner of the second end 106 (FIG. 1B), within the second end 106 (FIG. 1E) or within at the gap 102 between the first end 104 and second end 106 (FIG. 1F). FIG. 1G shows when the gap 102 has a narrowing taper from the first end 116 to the second end 118 such that W5 is larger than W6. FIG. 1H shows when the gap has a widening taper from the first end 116 to the second end 118 such that W5 is smaller than W6. While not shown, the etched face 120 may have other shapes, such as multiple corners, multiple curves, both convex and concave, wavy, or other shape or any combination thereof. Selective etching can allow for a multitude of shapes.

Figure 2A:
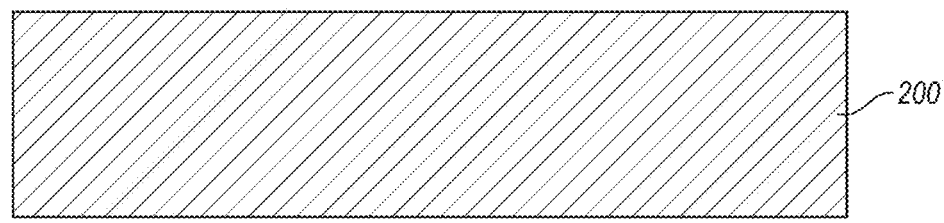
FIGS. 2A-2E illustrate an embodiment of a method of preparing a PSR device, where the view is an end view, showing the first end.
Figure 2B:
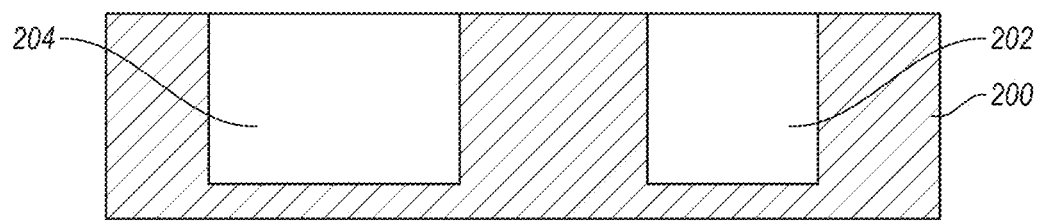
Figure 2C:
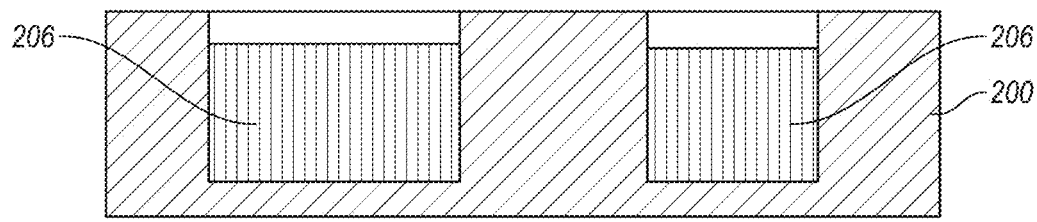
Figure 2D:
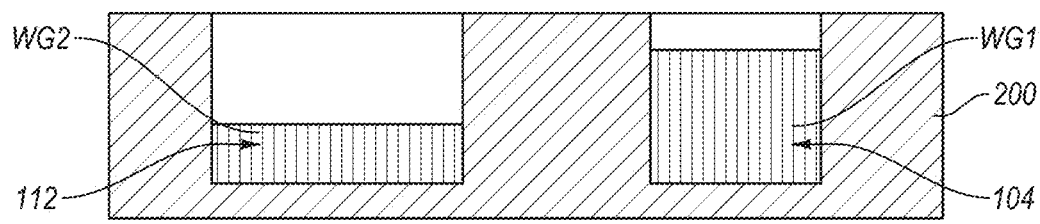
Figure 2E:
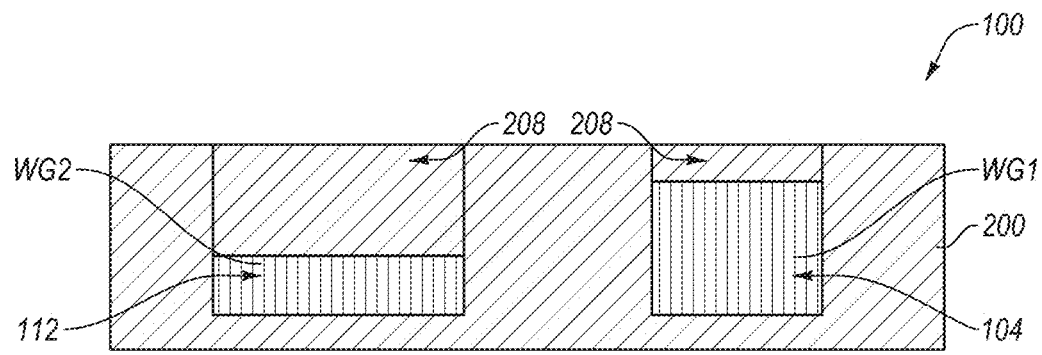

FIGS. 2A-2E show a method of preparing the PSR device 100 of FIGS. 1-1B, where the view is an end view, showing the first end where light enters. FIG. 2A shows a layer 200 being formed, such as Si waveguide layer, $SiO_2$, or Si substrate or other type of layer. FIG. 2B shows that layer 200 is etched to form two recesses, a first recess 202 for the primary through waveguide WG1 and a second recess 204 for the secondary cross waveguide WG2. FIG. 2C shows that the recesses 202, 204 are filled with a waveguide material 206 to a defined level, which may be partially filled as shown or fully filled. FIG. 2D shows that the waveguide material 206 is selectively etched in each recess 202, 204 in order to form the primary through waveguide WG1 and secondary cross waveguide WG2 having the relative dimensions and shapes as shown in FIGS. 1-1B. FIG. 2E shows that a cover material 208, such as $SiO_2$, which could be the same as the material of the substrate 200, or different, fills the recesses 202, 204, which may be partially or fully filled as shown. Additional other processes may be performed to provide other regions in the PSR device 100. Notably, the etch of FIG. 2D may be a 2 stage etch or partial etch to obtain the dimensions and shapes as shown herein for the primary through waveguide WG1 and secondary cross waveguide WG2.

Figure 2F:
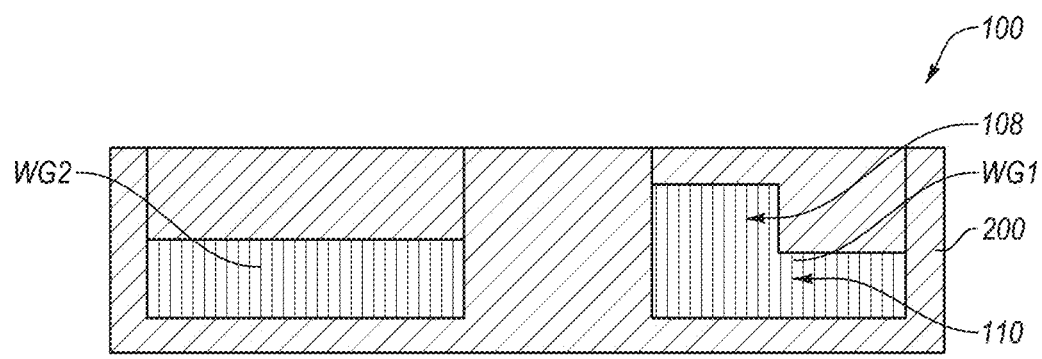
FIG. 2F illustrates an embodiment of a cross-sectional profile half way between the inlet side and the outlet side where light exits the PSR.
Figure 2G:
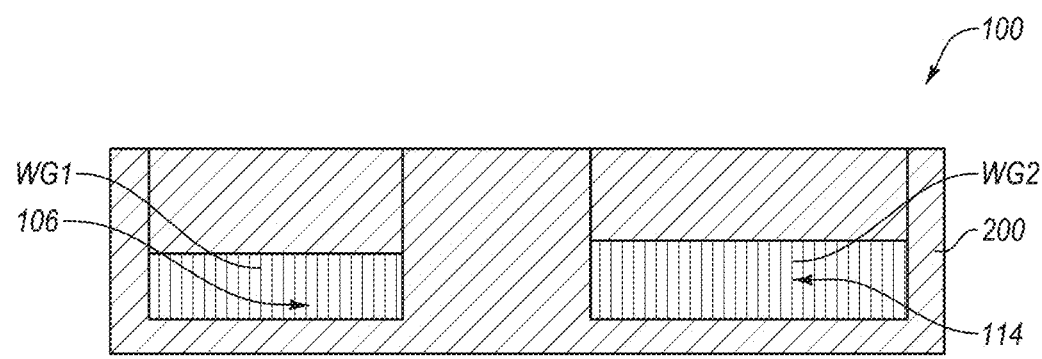
FIG. 2G illustrates an embodiment of the outlet side of the PSR where the top portion 108 has been completely removed at etching such that the top portion is a triangle shape as shown.

It is noted that FIGS. 2A-2E show the inlet side where light enters the PSR 100. FIG. 2F shows a cross-sectional profile halfway between the inlet side and the outlet side where light exits the PSR 100. FIG. 2G shows the outlet side of the PSR 100 where the top portion 108 has been completely removed at etching such that the top portion 108 is a triangle shape as shown.

In one embodiment, the primary through waveguide inlet side and the top portion thereof is a tall waveguide. Then, using the partial etch, the portion of the primary through waveguide and the entirety of the secondary cross waveguide are etched down to be shorter. Accordingly, the input side of the primary through waveguide is a tall waveguide that has a large thickness compared to the secondary cross waveguide; however, the partial etch results in the top portion being a triangle or other tapered shape when viewed from above, such that the width gets smaller from the inlet side to the outlet side where it becomes a thinner flat waveguide compared to the inlet side. The secondary cross waveguide is etched so that the entirety is a thinner waveguide compared to the inlet of the primary through waveguide. This processing and shaping can reduce the confinement on both the primary through waveguide and secondary cross waveguide so that the light traversing therethrough can have less confinement, and thereby the light can have more overlap between the two different waveguides. As a result, the coupling will be faster. As another result, the TM mode tends to be confined in the taller waveguide section so when the TM propagates to the secondary cross waveguide, the TE mode will remain in the primary through waveguide. On the other hand, the TM mode will be squeezed in the narrowing of this taller region that is physically closer to the secondary cross waveguide. As a result, the TM mode has better coupling to the secondary cross waveguide to convert to the TE mode. This will also increase the coupling efficiency.

Figure 3A:
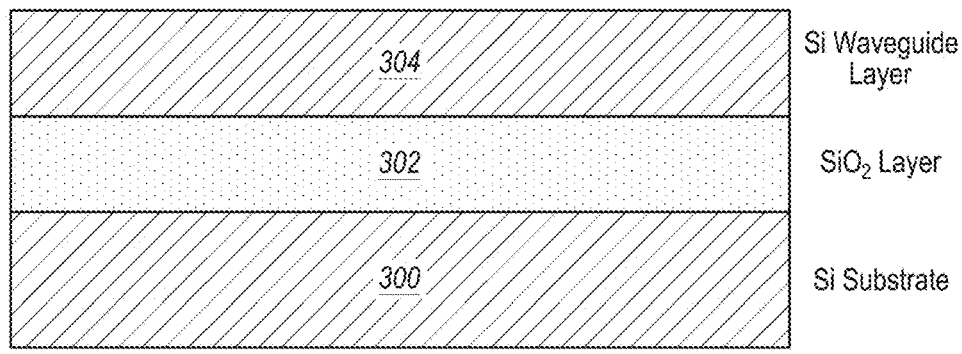
FIGS. 3A-3D illustrates an embodiment of a method of preparing the PSR device of FIGS. 1-1B, where the view is an end view, showing the first end.
Figure 3B:
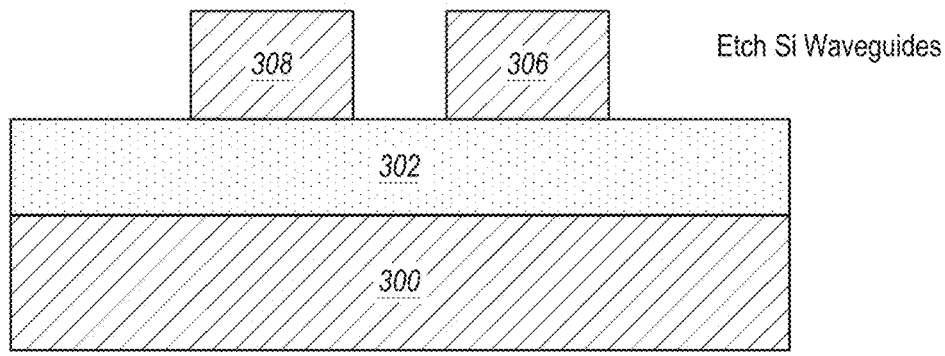
Figure 3C:
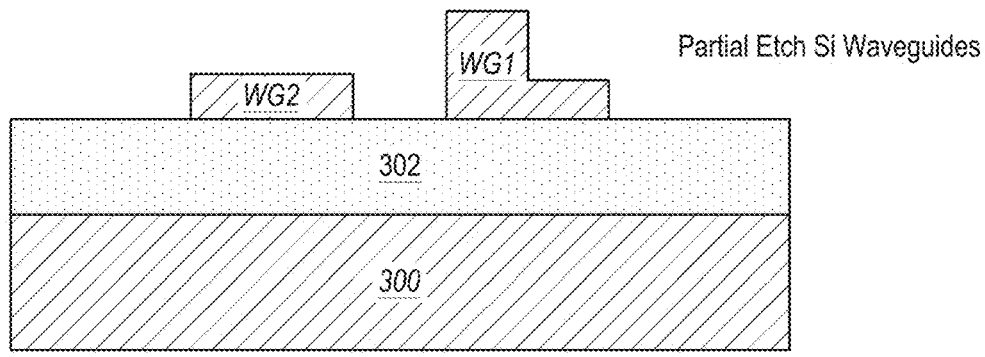
Figure 3D:
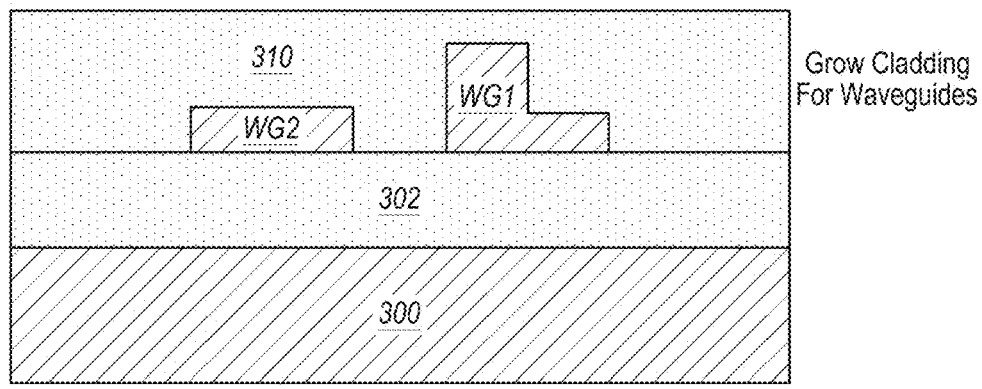

FIGS. 3A-3D show a method of preparing the PSR device 100 of FIGS. 1-1B, where the view is an end view, showing the first end (e.g., where light often enters). FIG. 3A shows a substrate 300 being formed, then a SiO$_2$ layer 302 being formed, and then a Si waveguide layer 304 being formed. FIG. 3B shows that waveguide layer 304 is etched to form two waveguides, a first waveguide 306 for the primary through waveguide WG1 and a second waveguide 308 for the secondary cross waveguide WG2. FIG. 3C shows that the waveguides 306, 308 are selectively etched (e.g., partial etch) in order to form the primary through waveguide WG1 and secondary cross waveguide WG2 having the relative dimensions and shapes as shown in FIGS. 1-1B. FIG. 3D shows that a cover material 310, which could be the same as the SiO$_2$ layer 302 forms a cladding for the waveguides as shown. Additional other processes may be performed to provide other regions in the PSR device 100.

Figure 4:
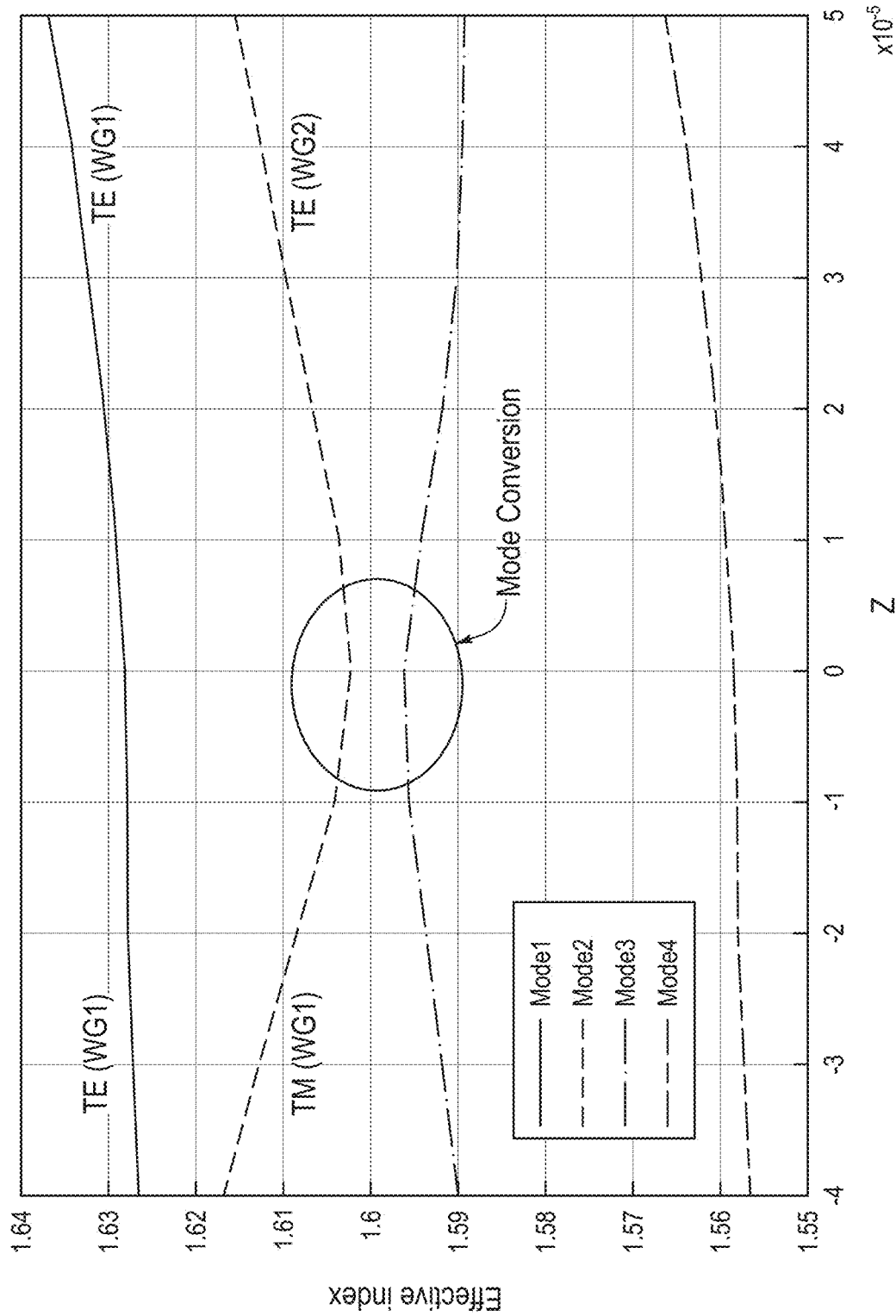
FIG. 4 is a graph that shows the effective index over length in either direction (first end to second end, as per arrangement of FIG. 1) along the taper, there is a light propagation direction.

The configuration of the primary through waveguide and secondary cross waveguide provided herein allows for either waveguide to be prepared in a wide range of dimensions. This allows for substantially any workable thickness, such as those provided herein. Accordingly, the design of the PSR having the primary through waveguide and secondary cross waveguide mode can be performed to calculate the mode, such as hybrid mode, from one end to the other. The data of FIG. 4 (or relevant data for a similar design) can be used in such a calculation. As seen in FIG. 4 in either direction (first end to second end, as per arrangement of FIG. 1) along the taper, there is a light propagation direction. On the light input side there is a high index for a fundamental mode. For the higher index mode, the TE mode on the input into the primary through waveguide where the TE mode will remain in the highest index waveguide (e.g., with larger width) so that the TE mode stays in the primary through waveguide from input to output as shown by the TE (WG1) in FIG. 4, which is Mode 1. Mode 2 in FIG. 4 is the TM input into the primary through waveguide on the left side of the graph for TM (WG1) and shows the TM propagating through the primary through waveguide until reaching the mode conversion due to the index mode becoming smaller due to the partial etch and triangular shape of the top portion of the primary through waveguide, and thereby the presence of the secondary cross waveguide with increasing width from its input to output allows for the TM to cross and convert to TE and then propagate through the secondary cross waveguide as the TE mode. The index increases in the secondary cross waveguide to allow for the TM to convert to the TE mode and propagate therethrough in the TE mode. At the crossing point the light from the TM mode in the primary through waveguide will couple to the TE mode in the secondary cross waveguide. During the crossing, the light traverses the gap (e.g., silicon oxide). In FIG. 4, the input is on the left and output is on the right, and the crossing point depends on the wavelength of the light, and thereby the broadband has a crossing point for each wavelength. In FIG. 4, mode 4 is the TM mode in the secondary cross waveguide, which shows a higher order mode that does not have coupling or mode conversion. Mode 3 shows a hybrid of two modes, and the hybrid mode propagates as two modes coupled to each other.

The combination of the primary through waveguide and secondary cross waveguide allows for the PSR to function as described herein. The primary through waveguide has a bigger thickness (e.g., height) and a smaller width at the inlet compared to the secondary cross waveguide, and the output side of the primary through waveguide has a smaller thickness (e.g., height) and larger width than the input side of the primary through waveguide due to the widening taper and the partial etch forming the triangle shape in the top region. The output side of the secondary cross waveguide has a larger width than the input side of the secondary cross waveguide, but may have the same thickness (e.g., height), from the input to the output.

The combination of the primary through waveguide and secondary cross waveguide allows for the PSR to inherently include the rotator aspect to convert the TM mode to the TE mode. In part, the vertical symmetric and horizontal symmetric being broken allows for the TM to couple directly to the TE, which functions as a rotator. The configuration of the top portion shape functions as the rotator for the coupling.

As described herein, the thicknesses and widths at the first end (e.g., inlet side) of the waveguides can vary within defined ranges, which can be in relation to each other and to the thicknesses and widths at the second end (e.g., outlet side) of the waveguides. The dimensions can be defined by the platform, whether Si or SiN.

For Si, the thickness (e.g., height) of the primary through waveguide at the first end (e.g., inlet side) can range from 150 nm to 500 nm, or from 200 nm to 400 nm, or from 250 nm to 350 nm, or about 300 nm, or any range between these values. Due to the partial etch and removal of the top portion of the primary through waveguide when Si, the thickness (e.g., height) at the second end (e.g., outlet) can be from 25% to 75% of the thickness of the first end of the primary through waveguide, or 33% to 66% of the thickness of the first end of the primary through waveguide, or about 50% of the thickness of the first end of the primary through waveguide. For Si, the width of the primary through waveguide at the first end (e.g., inlet side) is always larger than the thickness, such as at least 125%, 150%, 200%, or 300% larger. Examples of the width of the primary through waveguide at the first end (e.g., inlet side) may range from 200 nm to 1000 nm, or from 300 nm to 800 nm, or from 400 nm to 600 nm, or about 500 nm, or any range between these values. The width of the second end (e.g., outlet) of the primary through waveguide is always wider than the first end (e.g., inlet) of the primary through waveguide, such that the second end (e.g., outlet) can be up to 125%, 150%, 200%, or 300% larger than the width of the first end (e.g., inlet) of the primary through waveguide. Examples of the width of the primary through waveguide at the second end (e.g., outlet side) may range from 250 nm to 1200 nm, or from 350 nm to 1000 nm, or from 450 nm to 800 nm, or about 600 nm, or any range between these values.

For Si, the thickness (e.g., height) of the secondary cross waveguide at the first end (e.g., inlet side) is the same or substantially the same (e.g., within 1%, 2%, 5%, 10%, etc.) as the thickness (e.g., height) of the second end (e.g., outlet) of the first through waveguide. As such, due to the partial etch when Si, the thickness (e.g., height) at the first end (e.g., inlet) of the secondary cross waveguide can be from 25% to 75% of the thickness of the first end of the primary through waveguide, or 33% to 66% of the thickness of the first end of the primary through waveguide, or about 50% of the thickness of the first end of the primary through waveguide. In an example, the thickness (e.g., height) at the first end (e.g., inlet) of the secondary cross waveguide can range from 35 nm to 375 nm, or from 66 nm to 264 nm, or from 75 nm to 200 nm, or about 125 nm, or any range between these values. However, it should be recognized that these are examples and the values may change. Also, the thickness of the secondary cross waveguide can be the same from the first end (e.g., inlet) to the second end (e.g., outlet) of the second cross waveguide. For Si, the width of the secondary cross waveguide at the first end (e.g., inlet side) can vary, and may be larger, the same, or smaller than the first end (e.g., inlet) of the primary through waveguide. However, for Si, the width of the secondary cross waveguide at the second end (e.g., outlet side) must be smaller than the width of the second end (e.g., outlet) of the primary through waveguide.

For Si, the length of both waveguides can be substantially the same as each other, and can vary based on design. Examples of lengths can be from 0.75 mm to 2.5 mm, 1 mm to 2.25 mm, or 1.75 mm to 2 mm, or around 2 mm. In one option, the length may be as small as 100 to 200 microns, and thereby can range from 100 microns to 2 mm, or 200 microns to 2 mm.

The gap width can also range when Si. For example, the gap width between the primary through waveguide and secondary cross waveguide may range from 100 to 600 nm, from 200 to 500 nm, from 300 to 400 nm, or about 350 nm.

For SiN, the dimensions are larger at all locations than in Si as recited above. The SiN can have dimensions at the same locations that are up to 125%, up to 150%, up to 175%, up to 200% (twice the size), or up to 250% (e.g., 2.5 times the size) as for the same location as the Si dimension.

For SiN, the length of both waveguides can be substantially the same as each other, and can vary based on design. Examples of lengths can be from 0.75 mm to 2.5 mm, 1 mm to 2.25 mm, or 1.75 mm to 2 mm, or around 2 mm. In one option, the length may be as small as 200 microns to 2 mm, and thereby can range from 200 nm to 2 mm, or 400 microns to 3 mm.

The gap width can also range when SiN, but may be the same as for Si. For example, the gap width between the primary through waveguide and secondary cross waveguide when SiN may range from 100 to 600 nm, from 200 to 500 nm, from 300 to 400 nm, or about 350 nm. However, the gap width when SiN may be larger than when Si, and thereby may be 120% to 190% compared to the width when Si, or 140% to 180% compared to the width when Si, or about 150% compared to the width when Si. Often, the width when SiN is less than twice the width when Si.

Figure 4A:
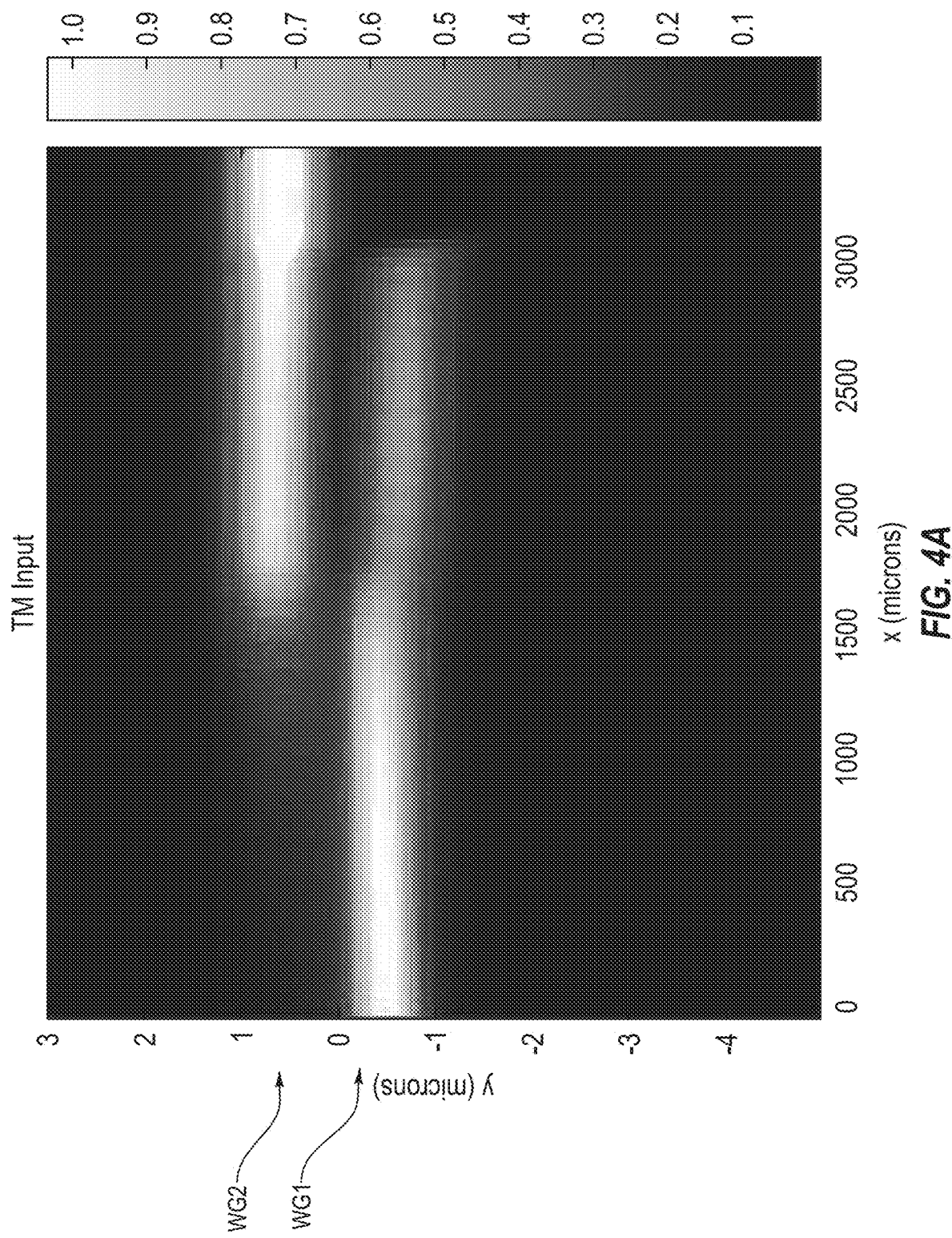
FIG. 4A shows the light propagation in the primary through waveguide (WG1) and secondary cross waveguide (WG2) for the TM input (left side) and the TE input (left side) and the TM crossing into WG2.
Figure 4B:
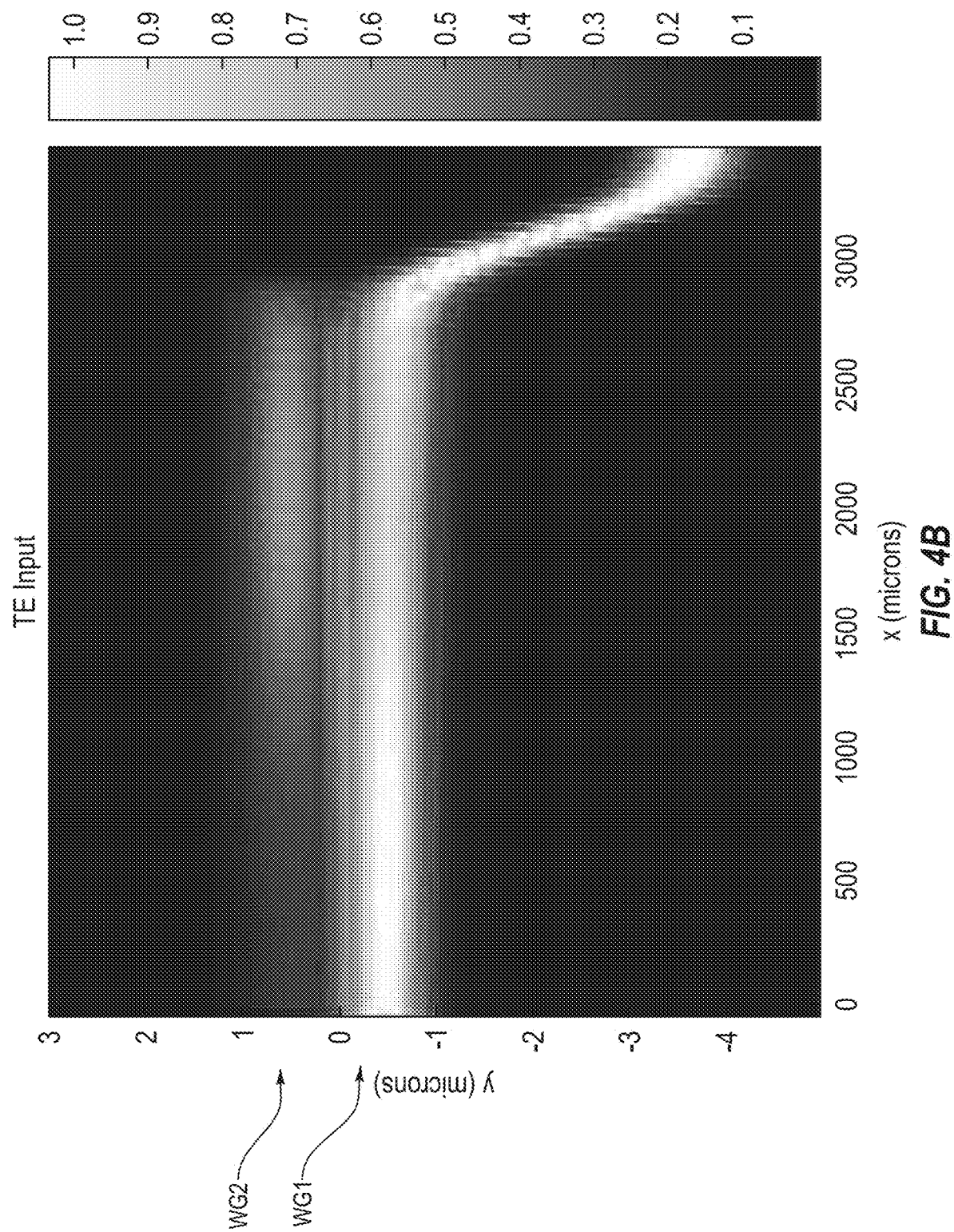
FIG. 4B shows that the TE from the inlet (left side) stays in the TE through the PSR, and then is provided to an S band shown at the right side where it bends downward.
Figure 6:
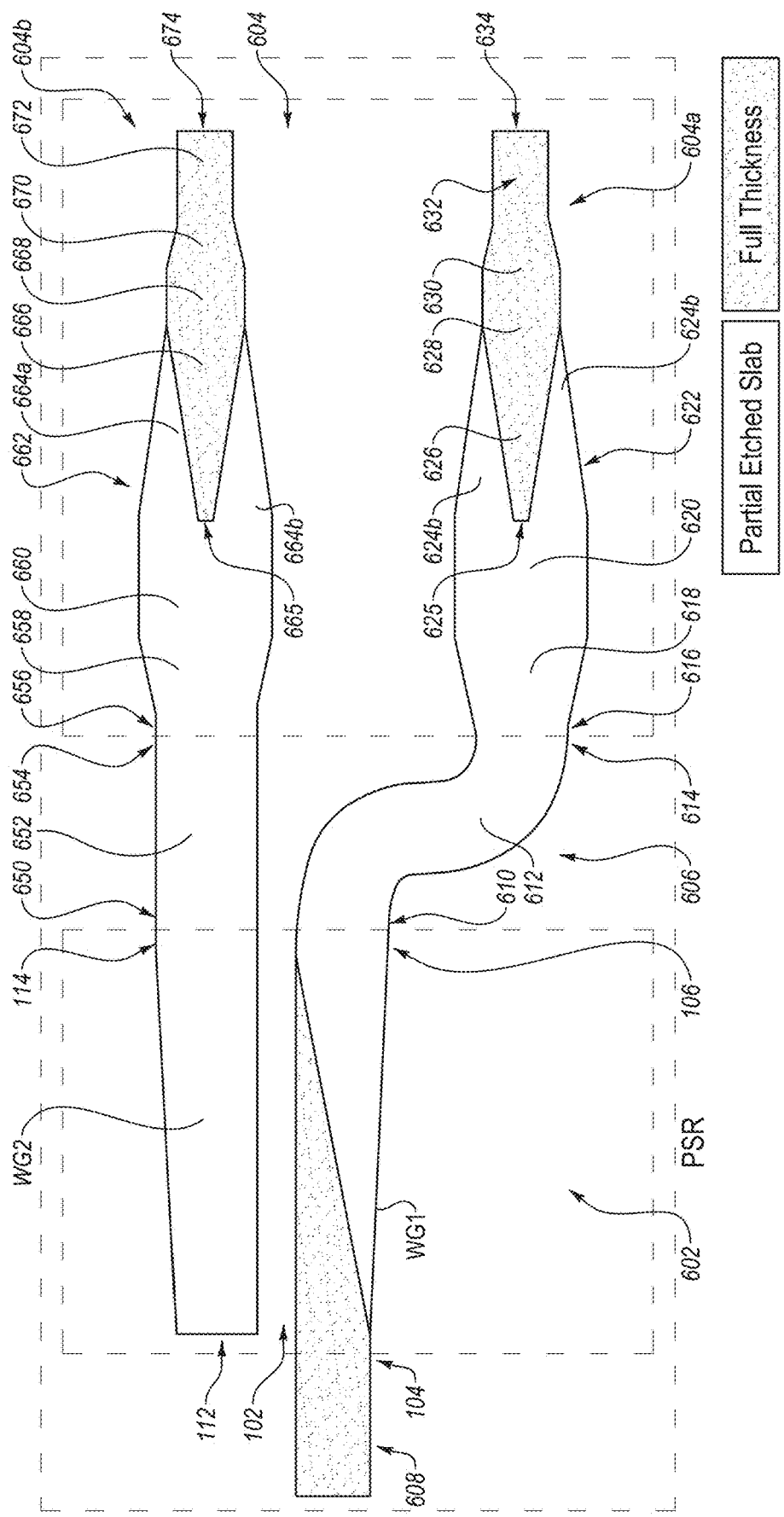
FIG. 6 illustrates an embodiment of a photonic integrated circuit (PIC) having a PSR and a slab to strip mode converter (STSMC) having a through STSMC and a cross STSMC.

FIG. 4A shows the light propagation in the primary through waveguide (WG1) and secondary cross waveguide (WG2) for the TM input (left side) and the TE input (left side). FIG. 4A shows the TM from the inlet (left side) is squeezed from the WG1 to the WG2 where it converts to TE light that can be obtained at the outlet (e.g., right side). FIG. 4B shows that the TE from the inlet (left side) stays in the TE through the PSR, and then is provided to an S band shown at the right side where it bends downward. This S bend is shown in FIG. 6 where the primary through waveguide is separated from the secondary cross waveguide. FIGS. 4A and 4B show the mode conversion and crossing from the primary through waveguide to the secondary cross waveguide.

Figure 5A:
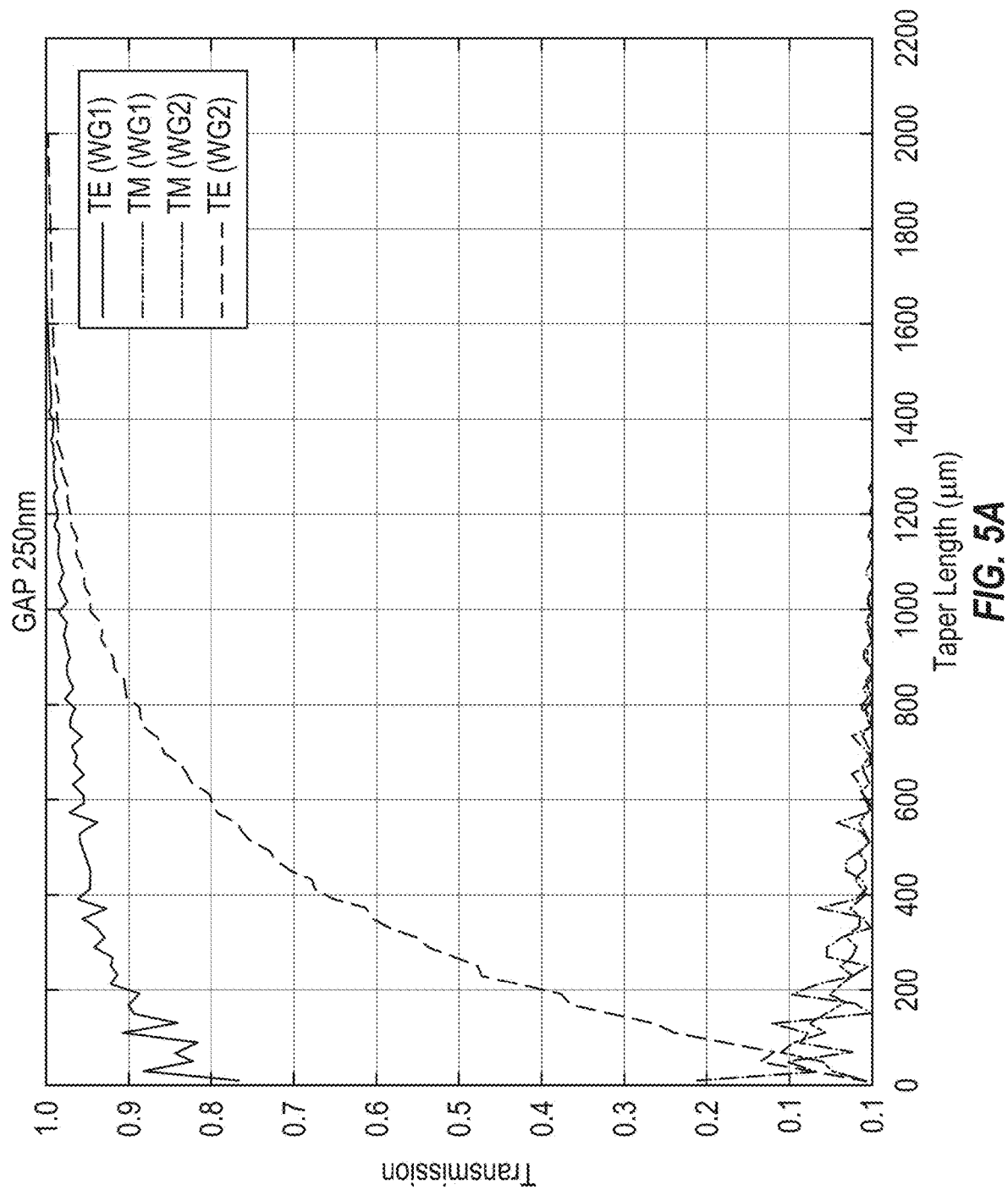
FIG. 5A is a graph that shows the transmission data for a PSR device with a 250 nm gap between the primary through waveguide and secondary cross waveguide compared to taper length for: TE in the primary through waveguide (WG1); TM in the primary through waveguide (WG1); TM in the secondary cross waveguide (WG2); and TE in the secondary cross waveguide (WG2).
Figure 5B:
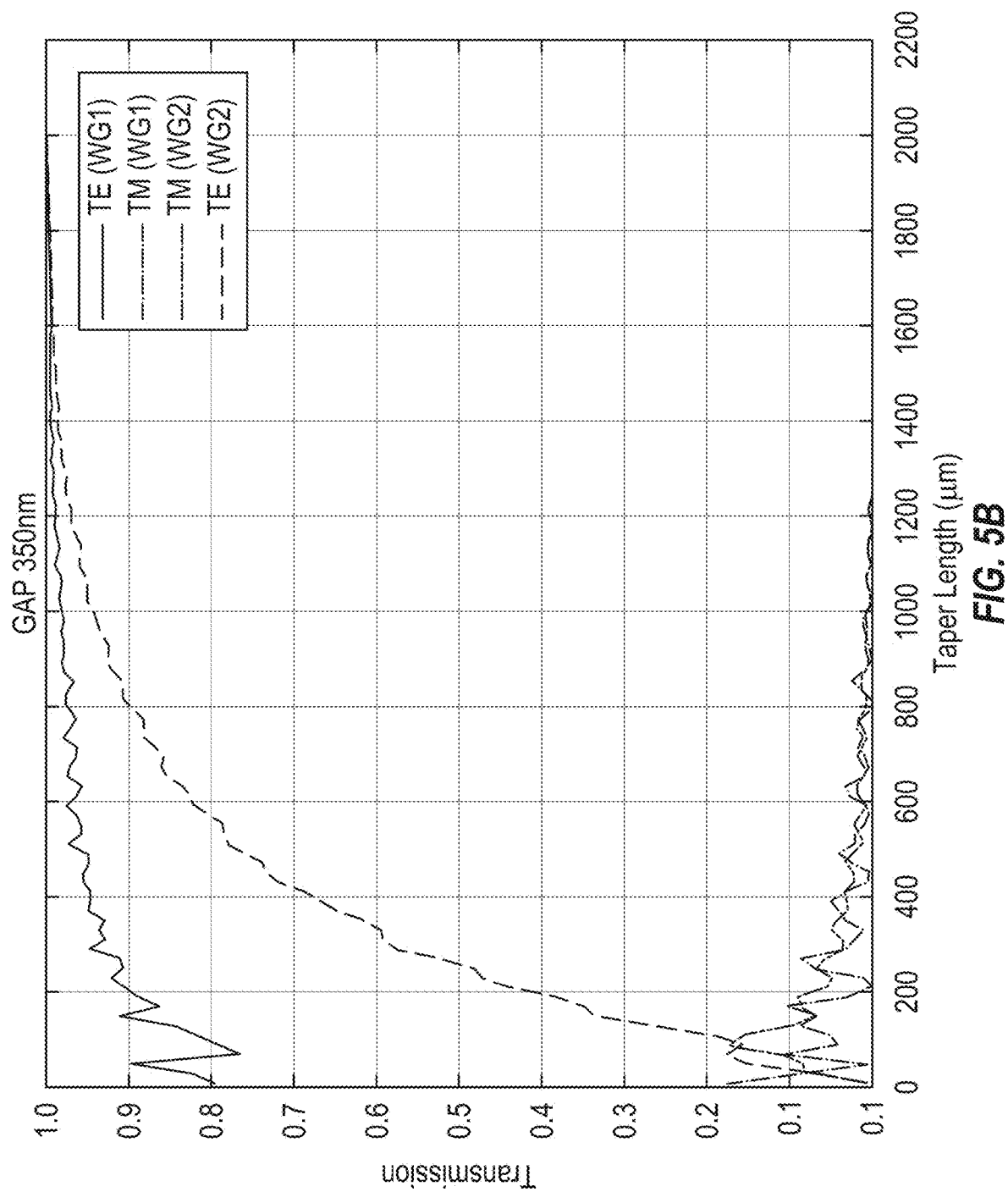
FIG. 5B is a graph that shows the transmission data for a PSR device with a 350 nm gap between the primary through waveguide and secondary cross waveguide compared to taper length for: TE in the primary through waveguide (WG1); TM in the primary through waveguide (WG1); TM in the secondary cross waveguide (WG2); and TE in the secondary cross waveguide (WG2).

FIG. 5A is a graph that shows the transmission data for a PSR device with a 250 nm gap between the primary through waveguide and secondary cross waveguide compared to taper length for: TE in the primary through waveguide (WG1); TM in the primary through waveguide (WG1); TM in the secondary cross waveguide (WG2); and TE in the secondary cross waveguide (WG2). The data shows the coupling. The TE in the primary through waveguide (WG1) remains therein. The TM in primary through waveguide (WG1) decreases and converts to the TE in the secondary cross waveguide (WG2). This shows that the TM light input into the primary through waveguide is converted to TE light and crossed into the second cross waveguide. The graph is showing the light coming in as a TM mode in WG1 and then as TE output on the WG2, which shows the conversion efficiency. The X-axis is the length of the PSR, so in this particular design, the length is about a 2 millimeter long taper to get TE and TM to have good conversion or coupling. The data shows more than 99% efficiency and a larger than 30 dB extinction ratio for both TE and TM. The ratio between the two outputs for TE mode is the extinction ratio for the TE. Similarly, the conversion of TM mode to TE mode is intended to be output from the WG2, but some of the TM light still remains with WG1, and as such the ratio between these two will be the extinction ratio from the TM mode. For both TM and TE the extinction ratio is greater than about 30 dB, which is favorable. Other designs often have the extinction ratio at 15-20 dB. FIG. 5B shows the similar data for the gap being 350 nm, which indicates that there is good fabrication tolerance that allows for large variations in the dimensions and parameters, such as described herein. This shows that the device can be easily fabricated even with minor errors being tolerated well because of the performance is the same between 250 nm to 350 nm, then minor errors, such as 20-30 nm will also provide the same (e.g., similar) performance.

The data in the figures also suggests that squeezing the TM mode toward the secondary cross waveguide, together with the less confined TE modes, enables high mode conversion efficiency. With the thinner waveguide, the mode is less confined, which can be used to couple to the other waveguide. Similarly, the PSR provides better conversion efficiency of the mode overlap so that there is faster mode conversion, which can reduce the length of the tapered waveguides and can also allow for wider gaps between the waveguides. There is also low loss because the TE input into the primary through waveguide mainly stays within the primary through waveguide without loss.

The wavelengths input into the PSR can be for about 1.26 micron up to about 1.67 micron or about 1.55 microns. The configuration of the PSR allows for a 300-500 microns band around wavelengths of 1.31 micron up to about 1.5 or about 1.55 microns. This provides the broadband.

The PSR can be used in PIC devices as known in the art.

In one embodiment, the PSR can be connected (e.g., coupled or integrated) with waveguides to bring the dimension back to full thickness (e.g., same as the input into the primary through waveguide). This can be done in a slab to strip mode conversion, such as shown in FIG. 6.

FIG. 6 shows a PIC 600 having the PSR 602 and the slab to strip mode converter (STSMC) 604 having a through STSMC 604a and a cross STSMC 604b. The dark regions show the full height and the light regions show the partially etched height, which can have the dimensions as recited herein. The PSR 602 can be prepared and dimensioned as described herein, where the output is coupled to a separator region 606 that separates the primary through waveguide (WG1) from the secondary cross waveguide (WG2). The output of the separator region 606 is input into the STSMC 604. The region around the waveguides (WG1 and WG2) can be the same as the gap material, such as silicon oxide (SiO$_2$).

The primary through waveguide WG1 is shown to have an inlet waveguide 608 that inputs the light into the first end 104, where the TE mode traverses the primary through waveguide WG1 to the second end 106. The second end 106 is coupled to a primary through waveguide separator inlet 610 that is connected with the S bend 612. The S bend 612 is connected with the primary through waveguide separator outlet 614. The primary through waveguide separator outlet 614 is connected to a through STSMC inlet 616 of the through STSMC widening taper 618. The through STSMC widening taper 618 is connected to the through STSMC waveguide 620 that has substantially constant dimension. The through STSMC waveguide 620 is connected to the through STSMC narrowing taper 622. The through STSMC narrowing taper 622 has the partially etched portion with the thickness Th2 split into a first through fork 624a and a second through fork 624b with a raised tapered through strip 626 therebetween. The raised tapered through strip 626 has a blunt through inlet 625 and an expanding taper until reaching the main through strip region 628. The main through strip region 628 extends until reaching the narrowing tapered through strip 630 that is connected to the through strip outlet region 632 having the through strip outlet 634.

The secondary cross waveguide WG2 does not have an inlet waveguide that inputs the light into the first end 112. Instead, the first end 112 does not receive input light. Instead, the TM mode from the primary through waveguide WG1 crosses and converts to TE mode that then traverses the secondary cross waveguide WG2 to the second end 114. The second end 114 is coupled to a secondary cross waveguide separator inlet 650 that is connected with the separator guide 652, which is shown as straight, but it can be an S bend or have other curve, just as the S bend 612 may be straight or have other curvature so long as one of the S bend region 612 or separator guide 652 provides for separating the primary through waveguide WG1 from the secondary cross waveguide WG2. The separator guide 652 is connected with the secondary cross waveguide separator outlet 654. The secondary cross waveguide separator outlet 654 is connected to a cross STSMC inlet 656 of the cross STSMC widening taper 658. The cross STSMC widening taper 658 is connected to the cross STSMC waveguide 660 that has substantially constant dimension. The cross STSMC waveguide 660 is connected to the cross STSMC narrowing taper 662. The cross STSMC narrowing taper 662 has the partially etched portion with the thickness Th2 split into a first cross fork 664a and a second cross fork 664b with a raised tapered cross strip 666 therebetween. The raised tapered cross strip 666 has a blunt cross inlet 665 and an expanding taper until reaching the main cross strip region 668. The main cross strip region 668 extends until reaching the narrowing tapered cross strip 670 that is connected to the cross strip outlet region 672 having the cross strip outlet 674.

Figure 6A:
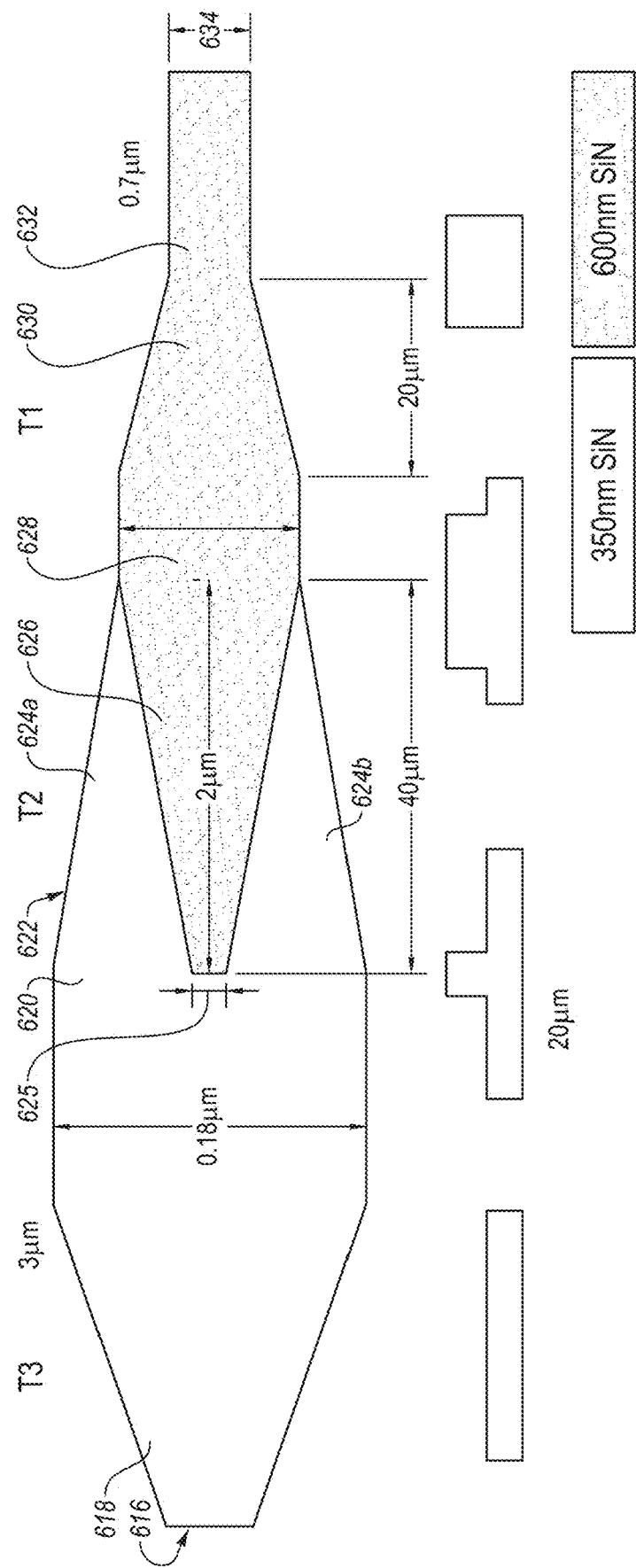
FIG. 6A illustrates an embodiment of a through STSMCs, however, it should be recognized that it may also referred to the cross STSMC because they can be identical in some embodiments.

FIG. 6A shows the through STSMCs 604a, however, it should be recognized that it may also referred to the cross STSMC 604b because they can be identical in some embodiments. The dark color represents the full height Th1 (e.g., 600 nm for SiN) and the lighter color represents the partial etch having Th2 (e.g., 350 nm for SiN). Below the STSMCs are the height profiles for the different regions of the STSMC 604a. As shown, the different regions are provided with their dimensions, which is one example for a SiN embodiment. It should be recognized that the dimensions may be different, such as smaller for a Si embodiment. The narrowing tapered through strip 630 can be the first taper T1, the STSMC narrowing taper 622 can be the second taper T2, and the STSMC widening taper 618 can be the third taper T3, all from the strip outlet 632. The STSMC provides a TE mode to TE mode coupling with about 99% coupling efficiency when the taper length of T2 is more than 40 microns as shown. The first taper T1 may have a length of 20 microns.

In FIG. 6A, the 3 μm is the width of wide section; 0.18 μm is the width of 625; 2 μm is the width of 628; and 0.7 μm is the width of 634.

As such, the STSMC allows to bring the waveguide to full thickness Th1. The partial etch portion Th2 is coupled to the full thickness waveguide Th1 without coupling loss, which may be considered adiabatic coupling. The taper of the raised tapered strip 626 can optimize for TE mode, so since there is only a TE mode in this region of the waveguide there has to be a good conversion efficiency from the mode in the partially etched waveguide to the full thickness waveguide.

Figure 7:
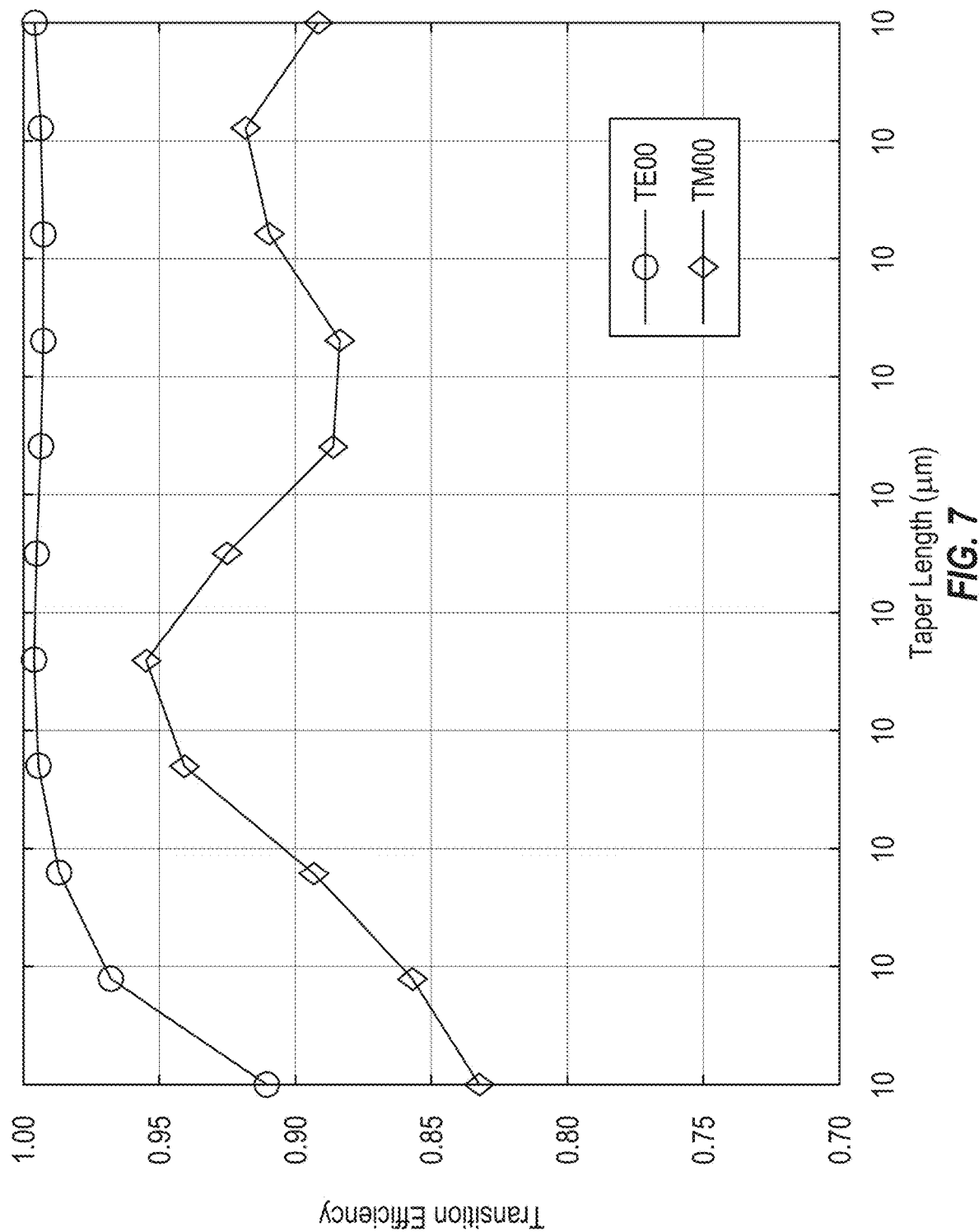
FIG. 7 is a graph that shows the transition efficiency for the TE mode or a TM mode versus taper length for the STSMC shown in FIG. 6A.

FIG. 7 shows the transition efficiency for the TE mode or a TM mode for the STSMC shown in FIG. 6A. As such, it can be seen that the coupling efficiency is about 99% as recited above.

It should be recognized that the STSMC is part of a PIC along with the PSR and the separator. The PIC may have other components as known in the art. Also, the STSMC may be operably coupled to outlet fibers from the through STSMC outlet and the cross STSMC outlet.

It should be recognized that the PSR may be used in reverse as a combiner, or used as shown as a splitter.

In one embodiment, any of the waveguides may include a cladding of $SiO_2$, where the body having the waveguides, as well as the gap, may be $SiO_2$.

In one embodiment, the primary through waveguide is adiabatically coupled with the secondary cross waveguide.

Figure 8:
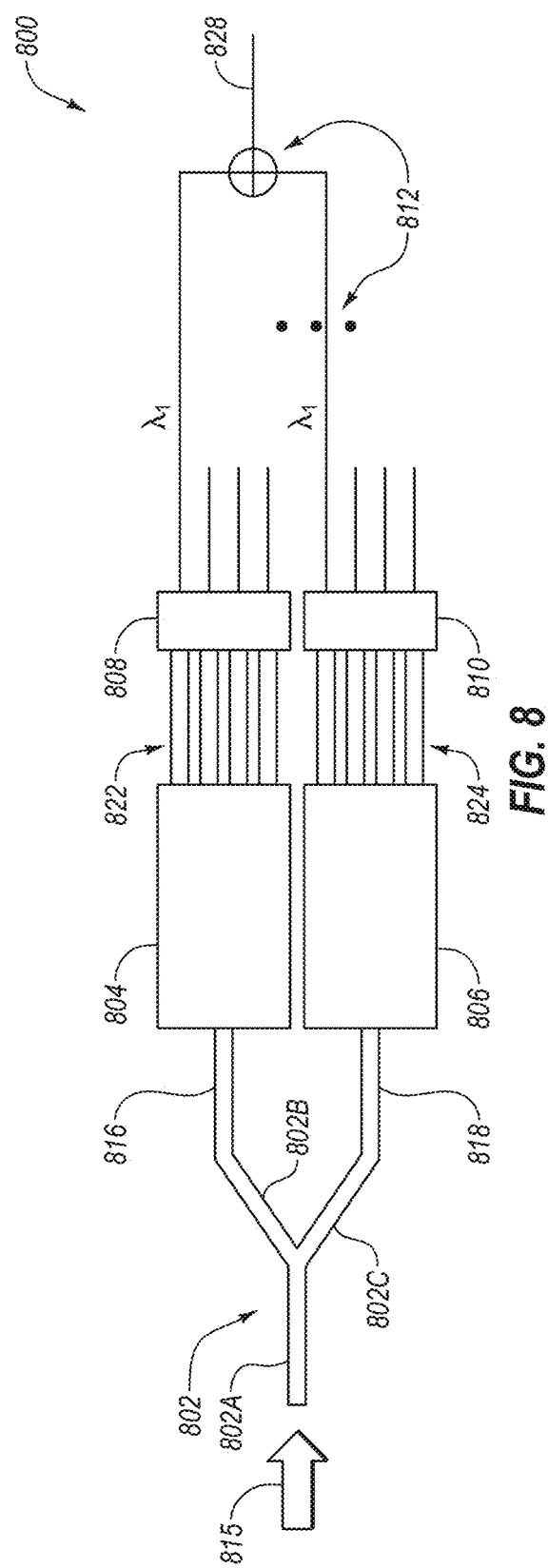
FIG. 8 illustrates an embodiment of a demultiplexer system, arranged in accordance with at least one embodiment described herein.

In one embodiment, the PIC may include a demultiplexer, such as shown in FIG. 8. FIG. 8 illustrates an example embodiment of a demultiplexer system 800, arranged in accordance with at least one embodiment described herein. Some or all of the demultiplexer system 800 may be implemented in a Si PIC having the PSR of FIG. 1 or of FIGS. 6-6A with the separator and STSMC. The demultiplexer system 800 includes a polarization splitter rotator 802 (hereinafter "PSR 802") that is configured as shown in the figures here, a first wavelength division multiplexing (WDM) demultiplexer (demux) 804, a second WDM demux 806, first opto-electrical transducers 808, second opto-electrical transducers 810, and adders 812 (only one of which is illustrated for simplicity). Additional adders 812 are denoted by ellipses in FIG. 8. It should be noted the PSR 802 may include the PSR, separator, and STSMC of FIGS. 6-6A.

The PSR 802 in the demultiplexer system 800 includes an input 802A and first and second outputs 802B and 802C (one being a through waveguide and one being a cross waveguide. In some embodiments, the first and second WDM demuxes 804 and 806 may be formed in the same layer of the Si PIC as the through and cross waveguides of the PSR 802.

The input 802A may include a first end of the first waveguide, the first output 802B may include a second end of the first waveguide, and the second output 802C may include a second end of the second waveguide. On the input, the PSR 802 may receive an input beam 815 that includes an N-channel optical signal (e.g., a multiplexed optical signal with N wavelength channels $\lambda 1, \lambda 2, \lambda 3, \ldots, \lambda n$) with two orthogonal polarizations, e.g., TE polarization and TM polarization. The input beam 815 may be split according to polarization, with a portion of the input beam 815 with TE polarization generally being outputted from the first or second output 802B or 802C and a portion of the input beam 815 with TM polarization generally being converted to TE polarization and outputted from the other of the second or first output 802C or 802B.

The portions of the input beam 815 that include TE and TM polarization may be respectively referred to as the TE channel and the TM channel, without respect to their actual polarization, but at the first and second outputs of the PSR 802 both are TE. That is, the TM channel has its polarization rotated by the PSR 802 such that it enters the PSR 802 with TM polarization and exits the PSR 802 with TE polarization, but even though it is now TE it may still be referred to as the TM channel because it originated as the TM mode.

Each of the first and second WDM demuxes 804 and 806 may be optimized for and/or specific to one of the two polarizations depending on the polarization of light that is input to the first or second WDM demux 804 or 806. In an example implementation, both the TE channel and the TM channel (e.g., in the converted TE mode) may exit the PSR 802 with the TE polarization such that both the first WDM demux 804 and the second WDM demux 806 may be optimized for or specific to the TE polarization. In these and other embodiments, each of the first and second WDM demuxes 804 and 806 may include an Echelle grating with or without a polarization-dependent filter function.

The first WDM demux 804 includes an input 816 optically coupled to the first output 802B of the PSR 802. Analogously, the second WDM demux 806 includes an input 818 optically coupled to the second output 802C of the PSR 802.

The first WDM demux 804 additionally includes outputs 822 optically coupled to the first opto-electrical transducers 808. Analogously, the second WDM demux 806 additionally includes outputs 824 optically coupled to the second opto-electrical transducers 810. The first opto-electrical transducers 808 and the second opto-electrical transducers 810 may each include at least N PN diodes, avalanche photodiodes (APDs), or other suitable optical receivers.

The adders 812 are electrically coupled to outputs of the first and second opto-electrical transducers 808 and 810, where each of the adders 812 is electrically coupled to an output of a corresponding one of the first opto-electrical transducers 808 and to an output of a corresponding one of the second opto-electrical transducers 810. In particular, for i=1 to N, an ith one of the adders 812 may be electrically coupled to an ith one of the first opto-electrical transducers 808 and to an ith one of the second opto-electrical transducers 810 to sum an electrical output of the ith one of the first opto-electrical transducers 808 with an electrical output of the ith one of the second opto-electrical transducers 810 to generate an ith combined electrical output 828.

In FIG. 8, in operation, the first WDM demux 804 may receive the TM channel of the input beam 815 from the first output 802B of the PSR 802 and may demultiplex it into the N distinct wavelength channels $\lambda 1, \lambda 2, \lambda 3, \ldots, \lambda N$ that are outputted to the first opto-electrical transducers 808. The first opto-electrical transducers 808 may each output an electrical signal representative of a corresponding one of the N distinct wavelength channels received at the corresponding one of the first opto-electrical transducers 808. Further, the second WDM demux 806 may receive the TE channel of the input beam 815 from the second output 802C of the PSR 802 and may demultiplex it into the N distinct wavelength channels $\lambda 1, \lambda 2, \lambda 3, \ldots, \lambda N$ that are outputted to the second opto-electrical transducers 810. The second opto-electrical transducers 810 may each output an electrical signal representative of a corresponding one of the N distinct wavelength channels received at the corresponding one of the second opto-electrical transducers 810.

The adders 812 may then combine the appropriate outputs from the first and second opto-electrical transducers 808 and 810 to generate an ith combined electrical signal 828 that is representative of the ith wavelength channel from the input beam 815 received at the input 802A of the PSR 802. In particular, a first (or second, or third, or Nth) one of the ith combined electrical signals 828 includes a sum of the electrical output of a first (or second, or third, or Nth) one of the first electro-optical transducers 808 that is representative of a first (or second, or third, or Nth) one of the N distinct wavelength channels output by the first WDM demux 804 and the electrical output of a first (or second, or third, or Nth) one of the second electro-optical transducers 810 that is representative of a first (or second, or third, or Nth) one of the N distinct wavelength channels output by the second WDM demux 806.

By splitting the TE channel from the TM channel (converted to TE mode), demultiplexing each separately from the other, and then adding corresponding channels with the adders 812, the demultiplexer system 800 of FIG. 8 may eliminate or at least significantly reduce channel cross-talk that may arise in WDM demuxes with polarization-dependent filter functions.

Various considerations and parameters associated with Si PIC polarization splitters are described in the '066 patent and may also apply to PSRs, such as the PSR 802. A summary of some of these considerations and parameters will be discussed, followed by a discussion of at least one example PSR.

For this and other processes and methods disclosed herein, the operations performed in the processes and methods may be implemented in differing order. Furthermore, the outlined operations are only provided as examples, and some operations may be optional, combined into fewer operations, eliminated, supplemented with further operations, or expanded into additional operations, without detracting from the essence of the disclosed embodiments.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety. This application is related to U.S. Pat. No. 9,405,066, issued on Aug. 2, 2016 (hereinafter the '066 patent). The '066 patent is incorporated herein by reference in its entirety.

The invention claimed is:

1. A polarization splitter rotator (PSR) comprising:
   a substrate;
   a primary through waveguide formed in the substrate having a through first end with a through first width and through first thickness with a through body with a widening taper extending from the through first end to a through second end that has a through second width that is larger than the through first width and the through second end having at least a portion thereof with a through second thickness that is smaller than the through first thickness, the through body having a top portion that extends toward the through second end and a bottom portion that extends to the through second end, the bottom portion having the widening taper from the through first end to the through second end, the top portion having a narrowing taper from the through first end toward the through second end that exposes a surface of the bottom portion, the exposed surface of the bottom portion having a widening taper from the through first end toward the through second end;
   a secondary cross waveguide formed in the substrate having a cross first end with a cross first width and cross thickness with a cross body with a widening taper extending from the cross first end to a cross second end that has a cross second width that is larger than the cross first width and the cross second end having the cross thickness; and
   a gap between the primary through waveguide and secondary cross waveguide.

2. The PSR of claim 1, wherein the gap has a substantially constant width from a gap first end between the through first end and cross first end to a gap second end between the through second end and cross second end.

3. The PSR of claim 1, wherein the substrate is $SiO_2$.

4. The PSR of claim 1, wherein the primary through waveguide is Si.

5. The PSR of claim 1, wherein the secondary cross waveguide is Si.

6. The PSR of claim 1, wherein the primary through waveguide is SiN.

7. The PSR of claim 1, wherein the secondary cross waveguide is SiN.

8. The PSR of claim 1, wherein the primary through waveguide has an "L" shaped cross-sectional profile in the width and height plane at a middle location between a first end and second end.

9. The PSR of claim 1, wherein the secondary cross waveguide has a rectangular cross-sectional profile with the cross first width is larger than the cross thickness.

10. The PSR of claim 1, wherein the top portion of the primary through waveguide has an etched face extending from a top surface to the exposed surface of the bottom portion.

11. The PSR of claim 10, wherein the etched face is linear between the through first end to through second end.

12. The PSR of claim 10, wherein the etched face is planar from the top surface to the exposed surface.

13. The PSR of claim 10, wherein the etched face terminates at a corner of the through second end.

14. The PSR of claim 10, wherein the etched face initiates at a corner of the through first end furthest from the secondary cross waveguide.

15. A method of converting TM mode light to TE mode light, comprising:

providing the PSR of claim 1; and inputting light having a TE mode and a TM mode into the first through end of the primary through waveguide such that the TM mode crosses from the primary through waveguide and converts to a second TE mode and enters the secondary cross waveguide, wherein the TE mode propagates through the primary through waveguide to a through second end, and the second TE mode propagates from a crossing point through the secondary cross waveguide to the cross second end.

16. The method of claim 15, wherein the input light has a wavelength from about 1.3 microns to about 1.55 microns with a broadband of about 300-500 microns around the wavelength.

17. A method of forming the PSR of claim 1, the method comprising:

forming the substrate;

etching the substrate to form a first recess and a second recess, the first recess and second recess each having a first end and a second end;

deposing a waveguide material in the first recess and second recess; and selectively etching the waveguide material in the first recess to form the primary through waveguide and in the second recess to form the secondary cross waveguide.

18. The method of claim 17, further comprising filling the first recess and second recess with a material over the exposed surface of the primary through waveguide and over the secondary cross waveguide.

19. A photonic integrated circuit (PIC) comprising:

the PSR of claim 1;

a separator having a through waveguide optically coupled with the primary through waveguide and a cross waveguide optically coupled with the secondary cross waveguide; and a slab to strip mode converter (STSMC) having a through STSMC optically coupled with the through waveguide of the separator and having a cross STSMC optically coupled with the cross waveguide of the separator.

20. The PIC of claim 19, wherein the through waveguide and cross waveguide of the separator each has the through second thickness.

21. The PIC of claim 19, wherein the through waveguide of the separator has an S bend.

22. The PIC of claim 19, wherein the through STSMC and cross STSMC each has:

a first widening taper with the through second thickness;
a first body region after the first widening taper with the through second thickness;
a first narrowing taper comprising:
  a first fork with the through second thickness;
  a second fork with the through second thickness; and
  a raised widening tapered strip between the first fork and second fork, the raised widening tapered strip having the through first thickness;
a second body region after the first narrowing taper having the through first thickness; and
a second narrowing taper after the second body region having the through first thickness.

23. A slab to strip mode converter (STSMC) comprising:
a through STSMC;
a cross STSMC; and
a gap between the through STSMC and cross STSMC, wherein the through STSMC and cross STSMC each has:
a first widening taper with the through second thickness;
a first body region after the first widening taper with the through second thickness;
a first narrowing taper comprising:
  a first fork with the through second thickness;
  a second fork with the through second thickness; and
  a raised widening tapered strip between the first fork and second fork, the raised widening tapered strip having the through first thickness;
a second body region after the first narrowing taper having the through first thickness; and
a second narrowing taper after the second body region having the through first thickness.

24. The STSMC of claim 23, wherein the through STSMC and cross STSMC each has:
a first widening taper with the through second thickness;
a first body region after the first widening taper with the through second thickness;
a first narrowing taper comprising:
  a first fork with the through second thickness;
  a second fork with the through second thickness; and
  a raised widening tapered strip between the first fork and second fork, the raised widening tapered strip having the through first thickness;
a second body region after the first narrowing taper having the through first thickness; and
a second narrowing taper after the second body region having the through first thickness.

* * * * *

UNITED STATES PATENT AND TRADEMARK OFFICE
CERTIFICATE OF CORRECTION

PATENT NO. : 10,684,416 B2
APPLICATION NO. : 16/045218
DATED : June 16, 2020
INVENTOR(S) : Lin et al.

Page 1 of 1

It is certified that error appears in the above-identified patent and that said Letters Patent is hereby corrected as shown below:

In the Claims

In Column 19, at Lines 21-22, in Claim 17, replace "deposing a waveguide material in the first recess and second recess; and" with --depositing a waveguide material in the first recess and second recess; and--.

Signed and Sealed this
Fourteenth Day of July, 2020

Andrei Iancu
*Director of the United States Patent and Trademark Office*